United States Patent
Jung et al.

(10) Patent No.: US 9,639,199 B2
(45) Date of Patent: May 2, 2017

(54) METHOD AND DEVICE FOR CONTROLLING A USER INTERFACE

(71) Applicant: SAMSUNG ELECTRONICS CO., LTD., Suwon-si (KR)

(72) Inventors: Jong-woo Jung, Hwaseong-si (KR); In-Sik Myung, Incheon (KR); Hye-Won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 14/285,100

(22) Filed: May 22, 2014

(65) Prior Publication Data

US 2014/0362007 A1 Dec. 11, 2014

(30) Foreign Application Priority Data

Jun. 7, 2013 (KR) .......... 10-2013-0065169
Sep. 23, 2013 (KR) .......... 10-2013-0112862

(51) Int. Cl.
*G06F 3/041* (2006.01)
*G06F 3/0488* (2013.01)

(52) U.S. Cl.
CPC ........ *G06F 3/0416* (2013.01); *G06F 3/04883* (2013.01); *G06F 3/04886* (2013.01)

(58) Field of Classification Search
CPC . G06F 3/04883; G06F 3/04886; G06F 3/0416
See application file for complete search history.

(56) References Cited

U.S. PATENT DOCUMENTS

| | | | |
|---|---|---|---|
| 2004/0233171 A1* | 11/2004 | Bell | G06T 15/40 345/168 |
| 2004/0240739 A1* | 12/2004 | Chang | G06F 3/04883 382/186 |
| 2005/0147322 A1* | 7/2005 | Saed | G06K 9/64 382/284 |
| 2006/0132457 A1* | 6/2006 | Rimas-Ribikauskas | G06F 3/04847 345/173 |
| 2007/0180400 A1 | 8/2007 | Zotov et al. | |
| 2009/0103134 A1* | 4/2009 | Fukushima | B41J 3/445 358/1.15 |
| 2010/0005428 A1 | 1/2010 | Ikeda et al. | |
| 2011/0119624 A1 | 5/2011 | Coldefy et al. | |
| 2011/0175930 A1* | 7/2011 | Hwang | G06F 3/0481 345/629 |

(Continued)

FOREIGN PATENT DOCUMENTS

KR 10-2006-0057421 A 5/2006

OTHER PUBLICATIONS

Communication dated Mar. 3, 2015 issued by the European Patent Office in counterpart European Patent Application No. 14170488.2.

*Primary Examiner* — Shaheda Abdin
(74) *Attorney, Agent, or Firm* — Sughrue Mion, PLLC

(57) ABSTRACT

Provided is a method and apparatus for controlling a user interface. The method of controlling a user interface of an electronic device includes: displaying a drawing object formed by a path input into the electronic device on a screen, and controlling the user interface by applying different functions to a drawing object area and the remaining area excluding the drawing object area in the touch screen.

33 Claims, 42 Drawing Sheets

(56) References Cited

U.S. PATENT DOCUMENTS

2011/0193795 A1\* 8/2011 Seidman ............ G01C 21/3664
  345/173
2011/0202835 A1\* 8/2011 Jakobsson ............. G06F 3/0481
  715/702
2012/0026100 A1 2/2012 Migos et al.

\* cited by examiner

METHOD AND DEVICE FOR CONTROLLING A USER INTERFACE

PRIORITY

This application claims the priority under 35 U.S.C. §119(a) to Korean Application No. 10-2013-0065169 filed in the Korean Intellectual Property Office on Jun. 7, 2013 and Korean Application No. 10-2013-0112862 filed in the Korean Intellectual Property Office on Sep. 23, 2013 the entire content of which is hereby incorporated by reference in their entirety.

BACKGROUND

1. Field

Methods and apparatuses consistent with one or more exemplary embodiments relate generally to a method and device for controlling a user interface.

2. Description of the Related Art

As we have entered into the digital era, the use of electronic devices including a touch screen have been popularized. A touch screen is an input device that may replace a keyboard and a mouse. By way of example, a touch panel that senses a touch of a user is attached on a Liquid Crystal Display (LCD) so that the user may perform a desired work. Particularly, it is appropriate for a small-sized terminal, for example, a mobile phone or an MP3 player.

A conventional user interface using a touch screen displays functions in a form of an icon or a menu so that a user recognizes and uses the various functions contained in an electronic device, and when the user clicks the displayed icon or menu, the user interface executes an application corresponding to the clicked icon or menu or converts the icon or the menu into a subordinate icon or a subordinate menu.

However, a conventional user interface using a stylus pen provides merely a two-dimensional diagram in response to a touch input of a user and thus, the user may have a limited experience associated with a touch input.

Accordingly, there is a desire for a user interface that may provide various touch input experiences. Also, a user interface is required that provides a drawing object associated with a touch input and a result associated with another function of an electronic device.

SUMMARY

An aspect of one or more exemplary embodiments is to provide method and device for controlling a user interface that may express a drawing object corresponding to a touch input of a user. Alternatively, method and device for controlling a user interface that may express a drawing object corresponding to an input other than a touch, such as by tracing a mouse.

Another aspect of one or more exemplary embodiment is to provide a user interface that may execute another application connected through a drawing object drawn by a user input while an application is executed.

In accordance with another aspect of one or more exemplary embodiment, a method for controlling a user interface of an electronic device is provided. The method includes: displaying, on a touch screen, a drawing object formed by a path input; and controlling a user interface by applying different functions to an area of the drawing object and the remaining area excluding the drawing object area.

The method further includes executing, inside the drawing object area, a second application that is different from a first application that is displayed in the remaining area.

Displaying includes providing a visual effect to an outline of the drawing object, and displaying the drawing object.

If the path is a closed pattern, the method further includes applying a predetermined color to the drawing object in response to at least one of a touch input and a drawing input provided to an area including the drawing object.

If the drawing object is a search box, the method further includes searching for information corresponding to a text written in the search box, and displaying the retrieved information on the touch screen.

The method further includes converting the drawing object area into a mode for receiving a touch using a body part of a user if the touch screen is in a mode for receiving a touch using an input unit, and converting the drawing object area into a mode for receiving a touch using the input unit if the touch screen is in a mode for receiving a touch using a body part of the user.

In accordance with another aspect of one or more exemplary embodiment, a method for controlling a user interface of an electronic device is provided. The method includes: displaying, on a touch screen, a drawing object formed by a path input; and providing a visual effect to the drawing object and displaying the drawing object.

The visual effect includes an effect in which the drawing object is separated along an outline of the drawing object and the drawing object is expressed based on a three-dimensional (3D) pop-up book scheme.

The visual effect includes an effect in which the drawing object expressed based on the 3D pop-up book scheme is swayed.

In accordance with another aspect of one or more exemplary embodiment, an electronic device configured to control a user interface is provided. The electronic device includes: a touch screen configured to display a drawing object formed by a path input; and a controller configured to control a user interface by applying different functions to an area of the drawing object and the remaining area excluding the drawing object area.

If the touch screen is in a mode for receiving a touch using an input unit, the controller converts the drawing object area into a mode for receiving a touch using a body part of a user, and if the touch screen is in a mode for receiving a touch using a body part of the user, the controller converts the drawing object area into a mode for receiving a touch using the input unit.

Also, a user interface that displays a drawing object corresponding to a path of a touch input, for example, a figure, a character, and the like, is provided when the user successively touches a touch screen using an input device such as a stylus pen. Accordingly, the user may write a memo or may draw a picture.

According to embodiments of one or more exemplary embodiment, there is provided a user interface method and device that may express a drawing object corresponding to a touch input in three-dimensions.

According to embodiments of one or more exemplary embodiment, there is provided a user interface that may execute another application connected through a drawing object drawn by a user input while an application is executed.

BRIEF DESCRIPTION OF THE DRAWINGS

The above and other aspects, features, and advantages of one or more exemplary embodiment will be more apparent from the following detailed description taken in conjunction with the accompanying drawings, in which.

DETAILED DESCRIPTION

Figure 1:
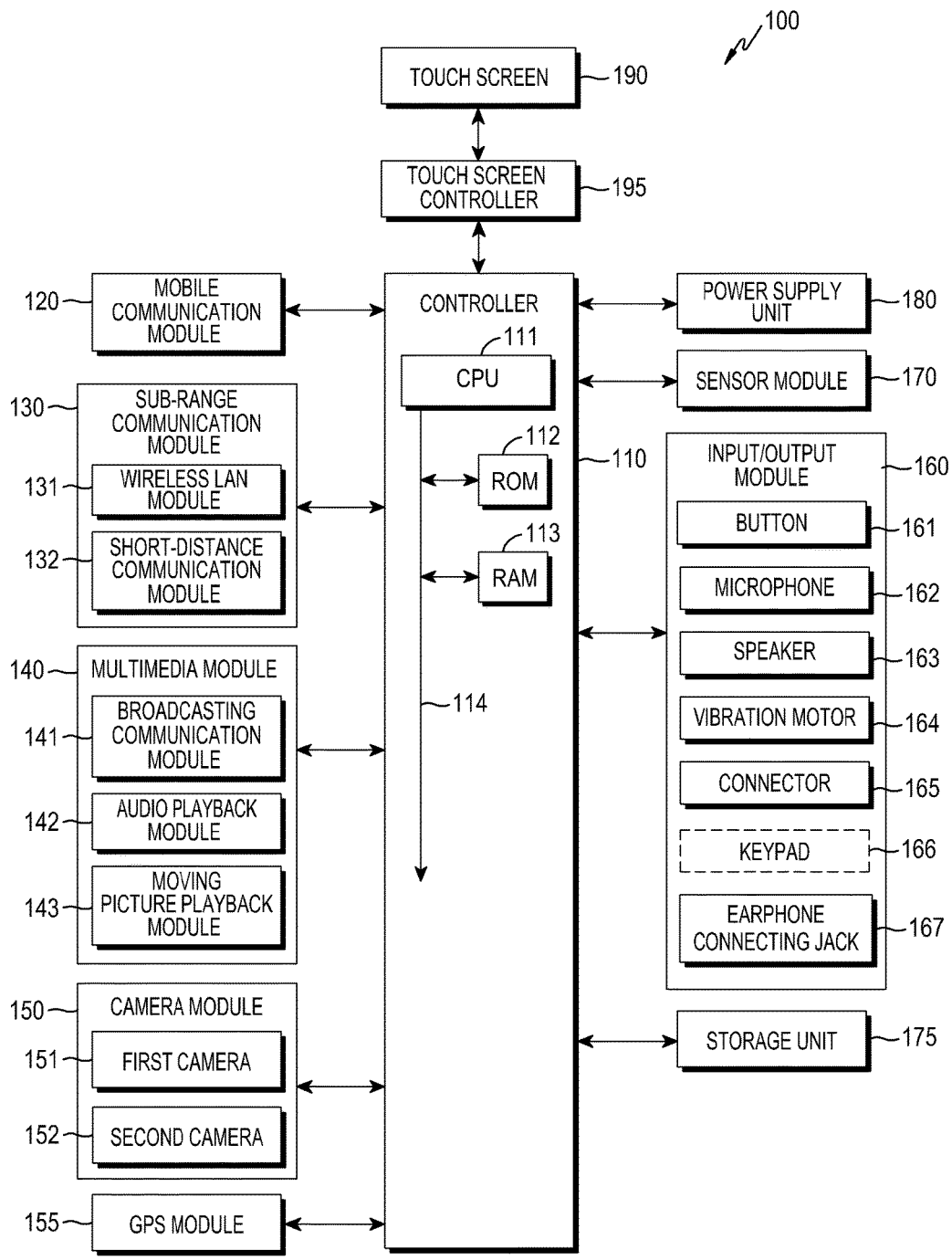
FIG. 1 is a diagram illustrating a configuration of an electronic device according to an exemplary embodiment.

Hereinafter, various exemplary embodiments will be described with reference to the accompanying drawings. In the following description, a detailed description of known functions and configurations incorporated herein will be omitted when it may make the subject matter unclear. Further, various specific definitions found in the following description are provided only to help general understanding of exemplary embodiments, and it is apparent to those skilled in the art that one or more exemplary embodiment can be implemented without such definitions. Therefore, the definitions thereof should be made based on the contents reflecting the entire description of the present specification.

One or more exemplary embodiment is to provide a user interface of which a visual effect is emphasized in an electronic device. According to an exemplary embodiment, the electronic device displays an execution screen of a first application as the first application that receives a drawing input of a user is executed. In this state, when successive user inputs occur on a touch screen, a drawing object associated with a touch path of the user may be displayed on the execution screen. According to an exemplary embodiment, the electronic device may display a visual effect associated with an outline of a drawing object. For example, the drawing object separated along the outline of the drawing object may be displayed as a dynamic object.

In this example, when a pattern of the drawing object is a closed pattern, a second application may be executed inside an area formed by the outline of the drawing object. In response to a function execution request of the user, an execution result of the second application may be applied to the first application. For example, an image representing an execution result of the first application may be included in the execution screen of the first application.

An application that receives a drawing input corresponds to an application that displays a drawing object representing a touch path on a touch screen when an input unit such as a stylus pen, an electronic pen, or a finger of a user, touches a touch screen. For example, a memo application, an instant messaging service application, a short message application, a diary application, an e-mail application, an SNS application, a photographing application, an image editing application, and the like may be included.

Also, in a state in which one application is executed, a first area selected by a drawing object generated by the user input and a second area remaining after excluding the first area may provide application functions different from each other.

An example of the electronic device according to an exemplary embodiment is illustrated in FIG. 1. Referring to FIG. 1, the electronic device (hereinafter, also referred to as a 'device') 100 may be connected to an external device (not illustrated) using a mobile communication module 120, a sub-range communication module 130, and a connector 165. As non-limiting examples, the "external device" may include a different device (not illustrated), a portable phone (not illustrated), a smart phone (not illustrated), a tablet PC (not illustrated), and a server (not illustrated).

FIG. 1 is a diagram illustrating a configuration of an electronic device according to an exemplary embodiment.

Referring to FIG. 1, the device 100 includes a touch screen 190 and a touch screen controller 195. Also, the device 100 includes a controller 110, a mobile communication module 120, a sub-range communication module 130, a multimedia module 140, a camera module 150, a GPS module 155, an input/output module 160, a sensor module 170, a power supply unit 180, and a storage unit 175. The sub-range communication module 130 includes at least one of a wireless LAN module 131 and a short-distance communication module 132, and the multimedia module 140 includes at least one of a broadcasting communication module 141, an audio playback module 142, and a moving picture playback module 143. The camera module 150 includes at least one of a first camera 151 and a second camera 152, and the input/output module 160 includes at least one of a button 161, a microphone 162, a speaker 163, a vibration motor 164, a connector 165, a key pad 166, and an earphone connecting jack 167. Although the device in FIG. 1 refers to a device containing a touch screen, exemplary embodiments are not limited to such. As a non-limiting example, the device may be a non-touch interactive screen and receive input through a mouse.

The controller 110 may include a CPU 111, a ROM 112 that stores a control program for controlling the device 100, and a RAM 113 that stores a signal or data input from the outside of the device 100 or is used as a memory region for an operation performed in the device 100. As non-limiting examples, CPU 111 may include a single-core, a dual-core, a triple-core, or a quad-core. The CPU 111, the ROM 112, and the RAM 113 may be mutually connected through an internal bus 114.

The controller 110 may control the mobile communication module 120, the sub-range communication module 130, the multimedia module 140, the camera module 150, the GPS module 155, the input/output module 160, the sensor module 170, the power supply unit 180, the storage unit 175, the touch screen 190, and the touch screen controller 195.

The controller 110 according to an exemplary embodiment may display a drawing object formed by a path input into the touch screen 190, may form a drawing object area and a remaining area that excludes the drawing object area on the touch screen, and may control a user interface by applying different functions to a drawing object area and the remaining area excluding the drawing object area in the touch screen 190. Alternatively, the drawing object formed by a path input into the device 100 by means other than a touch screen such as, as a non-limiting example, a mouse. The controller 110 may execute, inside the drawing object area, a second application that is different from a first application that is currently executed on the touch screen 190. The controller 110 may apply an execution result to the first application in response to a request for executing the second application. Also, the controller 110 may provide a visual effect to an outline of the drawing object and may display the drawing object.

When a plurality of second applications associated with the first application exist, the controller 110 may provide a list of the plurality of second applications to the touch screen 190, may call an application selected from the list, and may execute the application inside the area. When the second application is an image library application, the controller 110 includes displaying an image list inside the area, and displays a selected image to be included in an execution screen of the first application in response to a request for selecting at least one image from the displayed image list. When the second application is an image library application, the controller 110 displays an image list inside the area, crops a displayed image along an outline in response to an input of a request for completing selection of a selected image, and generates the cropped image as an input image with respect to the first application. When the second application is an image capturing application, the controller 110 activates a camera, displays a preview image captured through the camera inside the area, displays an image captured in response to a capturing command inside the area, and displays the captured image to be included in an execution screen of the first application as an input image with respect to the first application in response to a request for executing the image capturing application. When the second application is an image capturing application, the controller 110 activates a camera, displays a preview image captured through the camera inside the area, displays an image captured in response to a capturing command inside the area, crops the captured image along an outline in response to a request for executing the image capturing application, and generates the cropped image as an input image with respect to the first application. When the second application is a map application, the controller 110 displays a map image inside the area, and displays the map image to be included in an execution screen of the first application as an input image with respect to the first application in response to a request for executing the map application. When the second application is a map application, the controller 110 displays a map image inside the area, crops the map image along an outline in response to a request for executing the map application, and generates the cropped image as an input image with respect to the first application.

Also, the controller 110 senses a path input into the touch screen 190, and when the sensed path is a closed pattern, the controller 110 may apply a predetermined color to a drawing object formed by the path in response to at least one of a touch input and a drawing input provided to an area including the drawing object. When coloring is performed by sketch or drawing, coloring may stray from a predetermined area. Although coloring strays from the predetermined area, the controller 110 applies the predetermined color in the area, and removes coloring that strays from the area. When the drawing object is a search box, the controller 110 searches for information corresponding to a text written in the search box, and displays the retrieved information on the touch screen 190. When the touch screen 190 is in a mode for receiving a touch using an input unit, the controller 110 converts the drawing object area into a mode for receiving a touch using a body part of a user. When the touch screen 190 is in a mode for receiving a touch using a body part of the user, the controller 110 converts the drawing object area into a mode for receiving a touch using the input unit.

Also, the controller 110 according to another exemplary embodiment displays, on the touch screen 190, a drawing object formed by a path input into the touch screen 190, provides a visual effect to the drawing object, and displays the drawing object. The controller 110 that provides the visual effect to the touch screen 190 may control the touch screen 190 so that the drawing object is separated along an outline of the drawing object and the drawing object is expressed based on a 3D pop-up book scheme. The controller 110 may control the touch screen 190 so as to provide an effect in which the drawing object expressed based on the 3D pop-up book scheme is swayed. When the drawing object is an open pattern, the controller 110 controls the touch screen 190 so that the drawing object is separated along an outline of the drawing object and the drawing object is expressed based on the 3D pop-up book scheme. When the drawing object is a closed pattern, the controller 110 controls the touch screen 190 so that the entire drawing object is independently separated along an outline of the drawing object and the drawing object is expressed as a 3D graphic. When the drawing object is a closed pattern, the controller 110 may apply a predetermined color to the drawing object in response to at least one of a touch input and a drawing input provided to an area including the drawing object of the closed pattern. When at least one icon is displayed on the touch screen 190, the controller 110 moves the at least one displayed icon outside the drawing object formed on the touch screen.

The mobile communication module 120 connects the electronic device 100 to an external device through mobile communication, using one antenna or a plurality of antennas (not illustrated) based on a control of the controller 110. The mobile communication module 120 may perform transmitting and receiving of a wireless signal for a voice call, a video call, a short message service (SMS), or a multimedia message service (MMS), with a portable phone (not illustrated) having a phone number corresponding to a number input into the electronic device 100, a smart phone (not illustrate), a tablet PC (not illustrate), or other devices (not illustrate).

The sub-range communication module 130 may include at least one of the wireless LAN module 131 and the short-distance communication module 132. For example, the sub-range communication module 130 may include only the wireless LAN module 131, may include only the short-distance communication module 132, or may include both the wireless LAN module 131 and the short-distance communication module 132.

The wireless LAN module 131 may be connected to the Internet at a place where a wireless access point (AP) (not illustrated) is installed, based on a control of the controller 110. The wireless LAN module 131 supports the wireless LAN standards (IEEE802.11x) of the Institute of Electrical and Electronic Engineers (IEEE). The short-distance communication module 132 may wirelessly perform short-distance communication between the electronic device 100 and an image forming device (not illustrated) based on a control of the controller 110. The short-distance communication scheme may include Bluetooth, Infrared Data Association (IrDA), and the like.

The electronic device 100 may include at least one of the mobile communication module 120, the wireless LAN module 131, and the short-distance communication module 132. For example, the electronic device 100 may include a combination of the mobile communication module 120, the wireless LAN module 131, and the short-distance communication module 132.

The multimedia module 140 may include the broadcasting communication module 141, the audio playback module 142, or the moving picture playback module 143. The broadcasting communication module 141 may receive a broadcasting signal (for example, a TV broadcasting signal, a radio broadcasting signal, or a data broadcasting signal) and broadcasting subsidiary information (for example, EPG (Electronic Program Guide) or ESG (Electronic Service Guide)) transmitted from a broadcasting station, through a broadcasting communication antenna (not illustrated), based on a control of the controller 110. The audio playback module 142 may play back a stored or received digital audio file (of which a file extension may be mp3, wma, ogg, or wav, as non-limiting examples) based on a control of the controller 110. The moving picture playback module 143 may play back a stored or received digital moving picture file (of which a file extension may be mpeg, mpg, mp4, avi, mov, or mkv, as non-limiting examples) based on a control of the controller 110. The moving picture playback module 143 may play back a digital audio file.

The multimedia module 140 may include the audio playback module 142 and the moving picture playback module 143, excluding the broadcasting communication module 141. Also, the audio playback module 142 or the moving picture playback module 143 of the multimedia module 140 may be included in the controller 110.

The camera module 150 may include at least one of the first camera 151 and the second camera 152 that captures a still image or a moving picture based on a control of the controller 110. Also, the first camera 151 or the second camera 152 may include a secondary light source (for example, a flash (not illustrated)) that provides an amount of light for capturing an image. The first camera 151 may be disposed on a front side of the electronic device 100, and the second camera 152 may be disposed on a back side of the electronic device 100.

The GPS module 155 may receive a signal from a plurality of GPS satellites (not illustrated) in the Earth's orbit, and may calculate a location of the electronic device 100 based on a Time of Arrival (TOA) from a GPS satellite (not illustrate) to the electronic device 100.

The input/output module 160 may include at least one of the button 161, the microphone 162, the speaker 163, the vibration motor 164, the connector 165, and the keypad 166. The button 161 may include a plurality of buttons (not shown).

The button 161 may be formed on a front side, a lateral side, or a back side of a housing of the electronic device 100, and may include at least one of a power button (not illustrated), a lock button (not illustrated), a volume button (not illustrated), a menu button (not illustrated), a home button (not illustrated), a back button (not illustrated), and a search button (not illustrated).

The microphone 162 receives an input of a voice or a sound, and generates an electric signal, based on a control of the controller 110.

The speaker 163 may output, to the outside of the electronic device 100, a sound corresponding to various signals (for example, a wireless signal, a broadcasting signal, a digital audio file, a digital moving picture file, an image capturing signal, and the like) of the mobile communication module 120, the sub-range communication module 130, the multimedia module 140, or the camera module 150, based on a control of the controller 110. The speaker 163 may output a sound (for example, a button manipulation sound corresponding to a phone call or a ring-back tone) corresponding to a function performed by the electronic device 100. One or a plurality of speakers 163 may be formed on an appropriate location or locations of the housing of the device 100.

The vibration motor 164 may convert an electric signal into a mechanical vibration based on a control of the controller 110. For example, when the electronic device 100 in a vibration mode receives a voice call from another device (not illustrated), the vibration motor 164 may operate. One or a plurality of vibration motors 164 may be formed in the housing of the electronic device 100. The vibration motor 164 may operate in response to a touch motion of a user who touches the touch screen 190 or successive motions of a touch on the touch screen 190.

The connector 165 may be used as an interface for connecting the electronic device 100 and an external device (not illustrated) or a power source (not illustrated). Based on a control of the controller 110, data stored in the storage unit 175 of the electronic device 100 may be transmitted to an external device (not illustrated) or data may be received from an external device (not illustrated) through a wired cable connected to the connector 165. Through the wired cable connected to the connector 165, power may be input from a power source (not illustrated) or a battery (not illustrated) may be charged.

The keypad 166 may receive a key input from the user for controlling the electronic device 100. The keypad 166 includes a physical keypad (not illustrated) formed on the electronic device 100 or a virtual keypad (not illustrated) displayed on the touch screen 190. The physical keypad (not illustrated) formed on the electronic device 100 may be excluded depending on the performance or a configuration of the electronic device 100.

The sensor module 170 includes at least one sensor to detect a state of the electronic device 100. For example, the sensor module 170 may include a proximity sensor (not illustrated) to detect a proximity of the user to the electronic device 100 or a proximity of a finger or a pen (or an input unit) 200 and the like to a screen, an illuminance sensor (not illustrated) to detect an amount of light around the device 100, or an acceleration sensor (not illustrated) to detect a motion of the electronic device 100 (for example, a rotation of the electronic device 100 and an acceleration or vibration applied to the electronic device 100). The at least one sensor may detect a state including a direction and an incline of the electronic device 100, and may generate a signal corresponding to the detected state and may transmit the generated signal to the controller 110. One or more sensors of the sensor module 170 may be added to or removed from the electronic device 100.

The power supply unit 180 may supply power to one battery or a plurality of batteries (not illustrated) disposed on the housing of the electronic device 100, based on a control of the controller 110. One or a plurality of batteries (not illustrated) may provide power to the electronic device 100. Also, the power supply unit 180 may supply, to the electronic device 100, power input from an external power source (not illustrated) through the wired cable connected to the connector 165.

The storage unit 175 may store a signal or data input/output in association with an operation of the mobile communication module 120, the sub-range communication module 130, the multimedia module 140, the camera module 150, the GPS module 155, the input/output module 160, the sensor module 170, the touch screen 190, based on a control of the controller 110. The storage unit 175 may store a control program and application for controlling the electronic device 100 or the controller 110.

The storage unit 175 may include at least one of the ROM 112 and the RAM 113 included in the controller 110 and a memory card (not illustrated) (for example, an SD card and a memory stick) contained in the electronic device 100. The storage unit may include a non-volatile memory, a volatile memory, a Hard Disk Drive (HDD), or a Solid State Drive (SSD).

The touch screen 190 may provide a user with user interfaces corresponding to various services (for example, calling, data transmission, broadcasting, and image capturing). The touch screen 190 may transmit, to the touch screen controller 195, an analog signal corresponding to at least one touch input to a user interface. The touch screen 190 may receive an input of at least one touch through a body part of the user (for example, a finger including a thumb) or a touch device (for example, a stylus pen). Also, the touch screen 190 may receive an input of successive motions of one touch from among the at least one touch. The touch screen 190 may transmit, to the touch screen controller 195, an analog signal corresponding to a touch path associated with the successive motions of the input touch. The touch screen 190 may display a user interface controlled by the controller 110. Although the exemplary embodiment describes only one touch screen 190, this merely an example and an electronic device according to various exemplary embodiments may include at least one touch screen.

In one or more exemplary embodiments, the touch may not be limited to a contact between the touch screen 190 and a body part of the user or a touch device, and may include a non-contact. The detectable distance that may be detected by the touch screen 190 may be changed based on the performance or a configuration of the electronic device 100. The touch screen 190 may be embodied based on varied schemes, as non-limiting examples, a resistive scheme, a capacitive scheme, an infrared scheme, an Electronic Magnetic Resonance (EMR) scheme, an acoustic wave scheme, and the like or a combination thereof.

Figure 2:
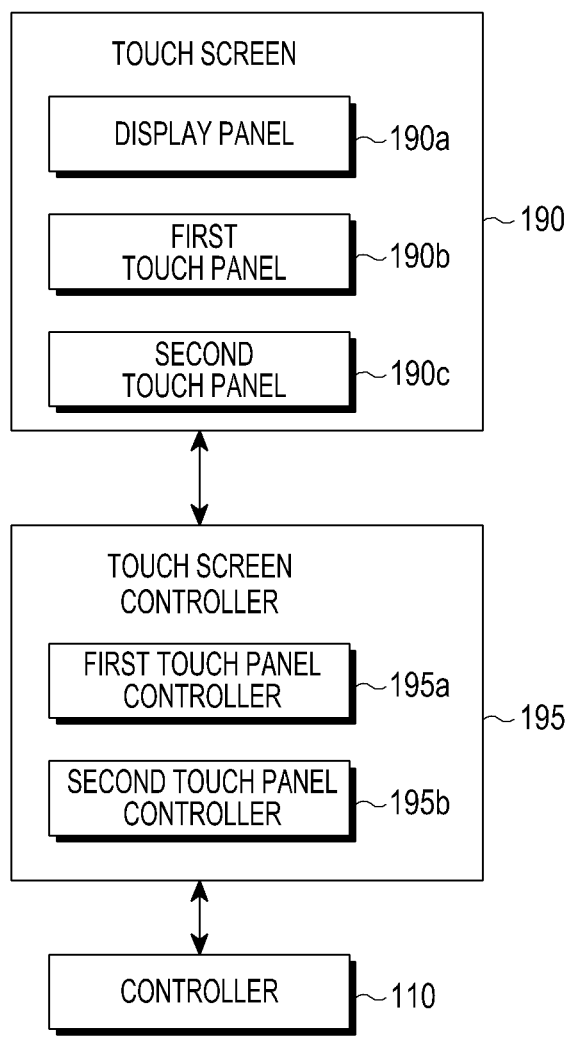
FIG. 2 is a diagram illustrating a configuration of a touch screen controller and a touch screen in an electronic device according to an exemplary embodiment.

In one or more exemplary embodiments, descriptions are provided by exemplifying the case in which a combination of the capacitive scheme of a first scheme and the EMR scheme of a second scheme is embodied. When the touch screen 190 embodied by the combination of the first scheme and the second scheme and a configuration of the touch screen controller will be described with reference to FIG. 2. FIG. 2 is a diagram illustrating a configuration of the touch screen 190 and the touch screen controller 195 according to an exemplary embodiment.

FIG. 2 is a diagram illustrating a configuration of a touch screen controller and a touch screen in an electronic device according to an exemplary embodiment.

Referring to FIG. 2, the touch screen 190 may include a display panel 190*a*, a first touch panel 190*b*, and a second touch panel 190*c*. The display panel 190*a* may be a panel such as an LCD, AMOLED, and like, and may display various operation states of the electronic device 100 and various images associated with execution of an application and a service, and the like.

The first touch panel 190*b* may be a capacitive touch panel, and is a panel of which two faces of a glass panel are coated with a thin metal conductive material (for example, ITO (Indium Tin Oxide) film and the like) so that a current flows through a surface of the glass panel, and which is coated with a dielectric substance that is capable of storing an electric charge. When a surface of the first touch panel 190*b* is touched by an object, a predetermined amount of electric charge moves to a contact point by a static electricity, and the first touch panel 190*b* recognizes a current variation based on the movement of the electric charge, and senses a location of the touch. The first touch panel 190*b* may sense all touches that may generate static, and may sense a touch by a hand or a pen.

The second touch panel 190*c* may be an EMR touch panel, and may include an electromagnetic induction coil sensor (not illustrated) having a grid structure in which a plurality of loop coils are disposed in a first direction which is determined in advance and a plurality of loop coils are disposed in a second direction which intersects with the first direction, and may include an electronic signal processing unit (not illustrated) that sequentially provides an alternating current (AC) signal having a predetermined frequency to each loop coil of the electromagnetic induction coil sensor. When the pen 200 containing a resonant circuit exists around a loop coil of the second touch panel 190*c*, a magnetic field transmitted from the corresponding loop coil may generate a current in the resonant circuit of the pen 200 based on mutual electromagnetic induction. Based on the current, an induction field may be generated from a coil that forms the resonant circuit of the pen 200, and the second touch panel 190c may detect the induction field from a loop coil which is in a state of receiving a signal and may sense an approach location or a touch location of the pen 200. The second touch panel 190c may sense an approach and a touch of an object when the object is capable of generating a current based on electromagnetic induction.

A first touch panel controller 195a converts an analog signal received through the first touch panel 190b by sensing a touch by a hand or a pen, into a digital signal (for example, X, Y, and Z coordinates), and transmits the digital signal to the controller 110. A second touch panel controller 195b converts an analog signal received through the second touch panel 190c by sensing an approach or a touch of the pen 200, into a digital signal, and transmits the digital signal to the controller 110.

The controller 110 may control the display panel 190a, the first touch panel 190b, and the second touch panel 190c using digital signals received from at least one of the first and the second touch panel controller 195a and 195b. For example, the controller 110 may enable a figure associated with a touch path, that is, a drawing object, to be displayed on the display panel 190a, in response to approach or a touch of a finger, the pen 200, or the like.

Figure 3:
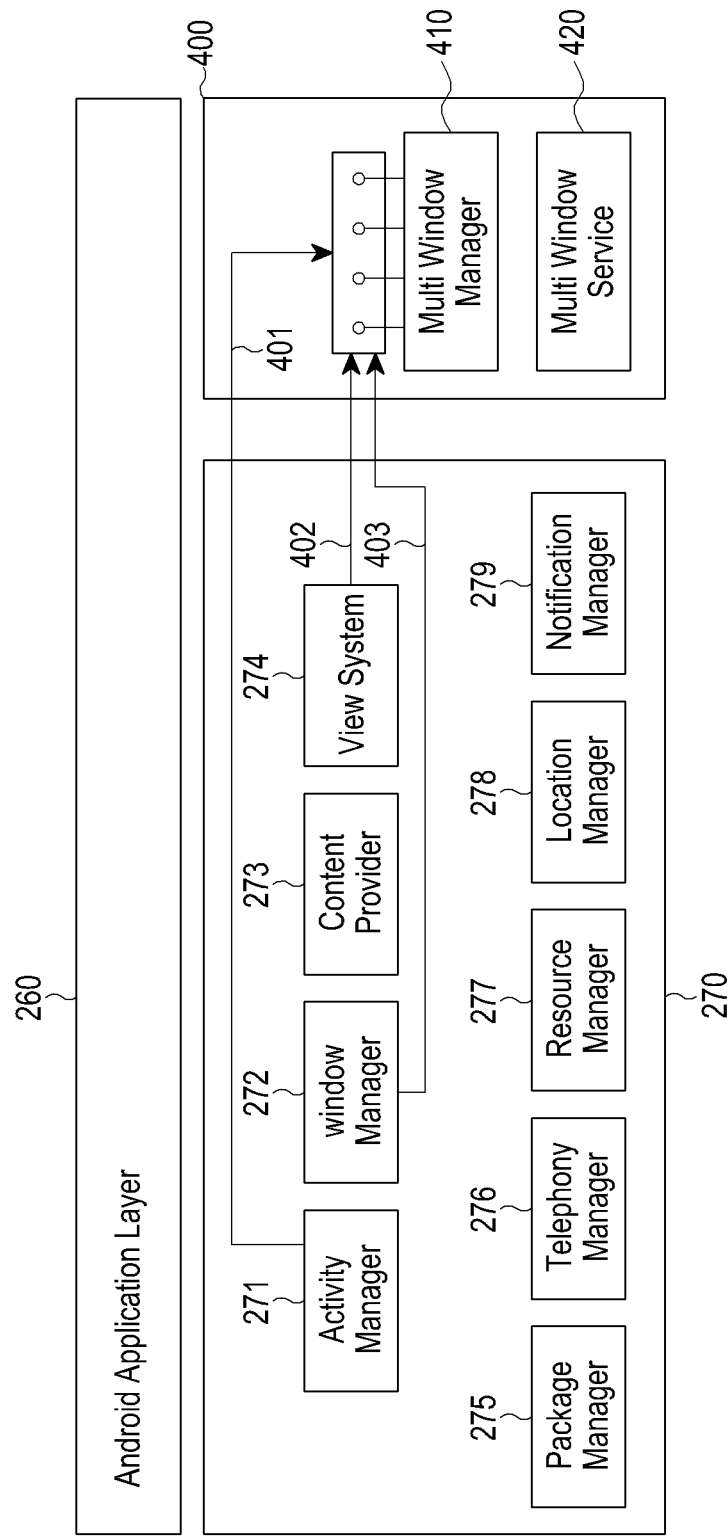
FIG. 3 is a diagram illustrating a frame according to an exemplary embodiment.

According to an exemplary embodiment, FIG. 3 illustrates an example of a frame that may be applied to the electronic device 100 so as to simultaneously execute a plurality of applications.

FIG. 3 is a diagram illustrating a frame according to an exemplary embodiment.

Referring to FIG. 3, a frame according to an exemplary embodiment may be formed of, for example, an application layer 260, a frame work 270, and a multi-window frame work 400.

The application layer 260 may be a set of applications that operate using an API provided by the frame work 270, and may include a third party application.

The frame work 270 may provide an API, and developers may establish an application based on the provided API.

An activity manager 271 may activate an application so that a plurality of applications are simultaneously performed.

A window manager 272 performs drawing or a control, for example, a touching, moving, and resizing, of a plurality of windows.

A content provider 273 enables an application to access data of another application, or to share its data with the other application.

A view system 274 may process a layout of a single window, a border, and a button, and may perform re-drawing.

A package manager 275 may process and manage an application.

A telephony manager 276 may provide access to telephony capabilities, such as making and receiving telephone calls.

A resource manager 277 may provide access to a non-code resource such as a localized character stream, a graphic, and a layer file.

A location manager 278 may process and manage positional information using a GPS.

A notification manager 279 may process and manage an event occurring in a system, for example, an alarm, a battery, and a network connection.

In the frame work 270, the activity manager 271, the window manager 272, and the view system 274 may be compatible with the multi-window frame work 400.

The multi-window frame work 400 includes a multi-window manager 410 and a multi-window service 420.

The activity manager 271, the window manager 272, and the view system 274 call an Application Program Interface (API) for a multi-window.

The multi-window manager 410 may provide a user with a function of the multi-window service 420 in a form of an API, and a Manager/Service structure may operate based on an IPC.

The multi-window service 420 traces lifecycles of applications executed through a multi-window, and manages a status of each application, such as a size, a location, and the like.

The called API may manage a size, a location, and a visibility of each application.

As described above, the frame work may be performed based on a scheme that provides an independent multi-window frame work and calls an API.

In addition, the application layer 260 may directly call an API from the multi-window manager 410. That is, a user may be provided with an API from the multi-window manager 410 and may use the API when the user develops a new application.

The frame may be applied to each component of the electronic device 100 and thus, each component of the electronic device 100 may perform an operation according to one or more exemplary embodiments, which will be described as follows. Hereinafter, an external structure of the electronic device 100 will be described.

Figure 4:
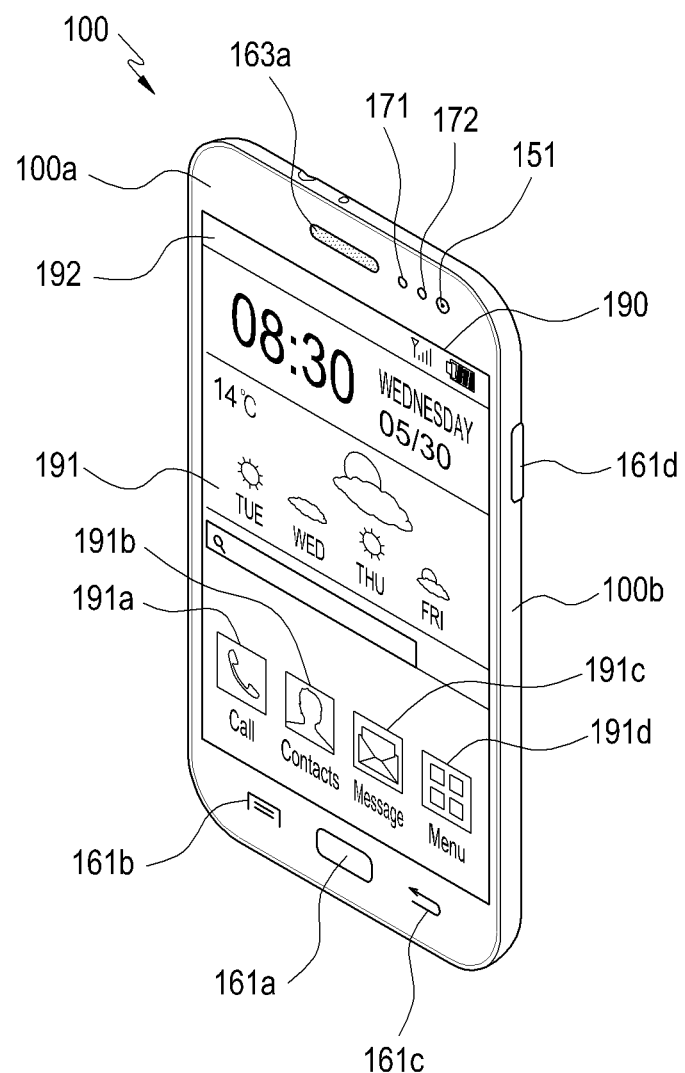
FIG. 4 is a front perspective view of an electronic device according to an exemplary embodiment.
Figure 5:
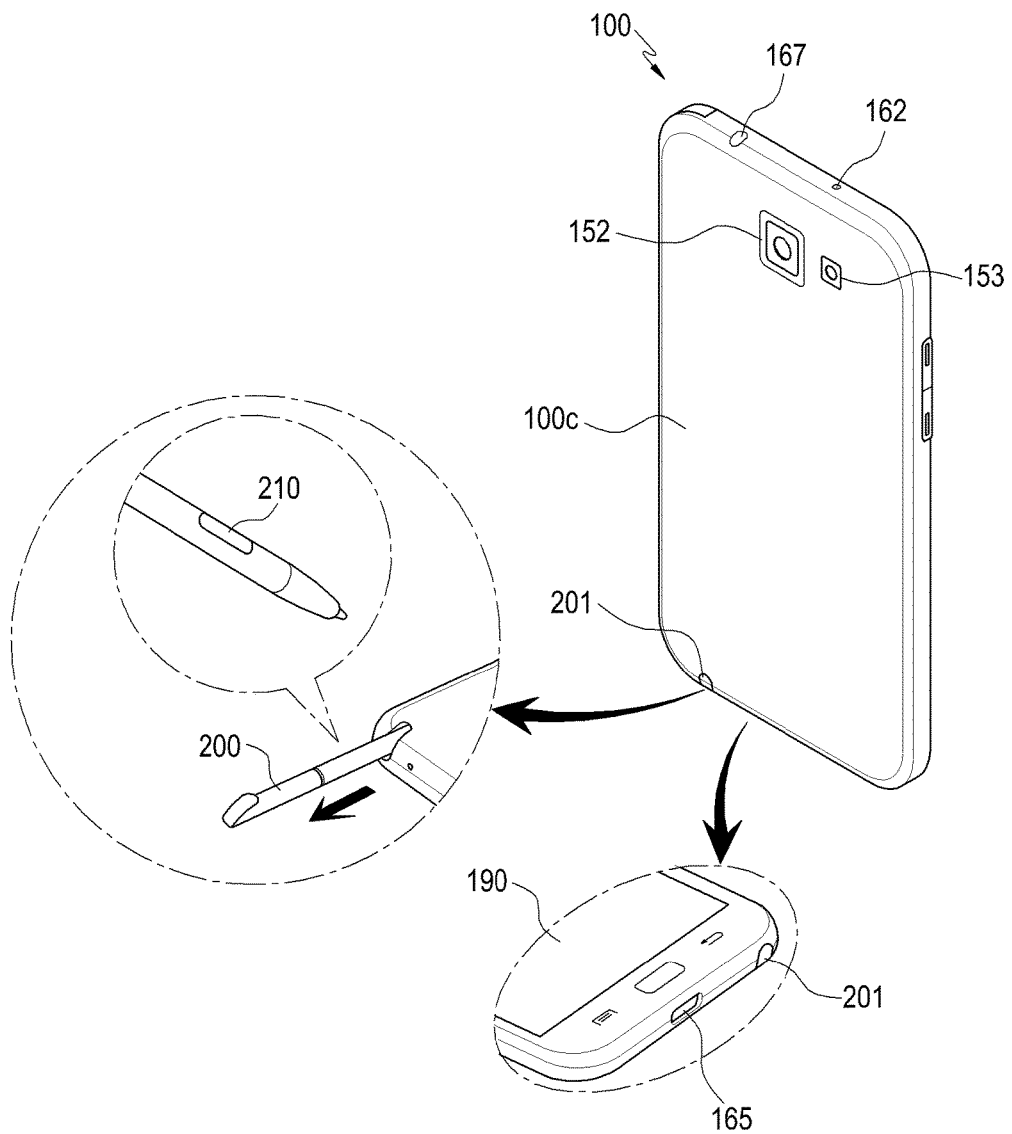
FIG. 5 is a back perspective view of an electronic device according to an exemplary embodiment.

FIG. 4 is a front perspective view of the electronic device 100 according to an exemplary embodiment, and FIG. 5 is a back perspective view of the electronic device 100 according to an exemplary embodiment.

Referring to FIG. 4 first, the touch screen 190 is disposed in the center of a foreside 100a of the electronic device 100. The touch screen 190 may be formed to be large so as to occupy most of the foreside 100a. FIG. 4 illustrates an example of the touch screen 190 that displays a main home screen 191. The main home screen 191 is the first screen displayed on the touch screen 190 when the device 100 is turned on. When the device 100 has a few pages of different home screens, the main home screen 191 may be the first home screen from among the few pages of home screens. In a home screen, shortcut icons 191a, 191b, and 191c for executing frequently used applications, a main menu switching key 191d, the time, the weather, and the like may be displayed. The main menu switching key 191d displays a menu screen on the touch screen 190. Also, a status bar 192 displaying a battery charging status, a strength of a received signal, and the current time may be formed on an upper end of the touch screen 190.

In a lower portion of the touch screen 190, a home button 161a, a menu button 161b, and a back button 161c may be formed. The home button 161a may enable a main home screen 191 to be displayed on the touch screen 190. For example, in a state in which any home screen that is different from the main home screen 191 or a menu screen is displayed on the touch screen 190, when the home key 161a is touched, the main home screen 191 may be displayed on the touch screen 190. Also, when the home button 191a is touched while applications are executed on the touch screen 190, the main home screen 191 illustrated in FIG. 4 may be displayed on the touch screen 190. Also, the home button 161a may enable recently used applications to be displayed on the touch screen 190 or may be used for displaying a task manager. The menu button 161b provides a link menu that may be used on the touch screen 190. The link menu may include a widget add menu, a background change menu, a search menu, an edit menu, a setting menu, and the like. The back button 161c may display a screen that is executed immediately before a currently executed screen or may terminate the most recently used application. On an edge of the foreside 100a of the electronic device 100, the first camera 151, a speaker 163a, a luminance sensor 171, and a proximity sensor 172 may be disposed.

On a lateral side 100b of the electronic device 100, for example, a power/reset button 161d, a volume button (not illustrated), a terrestrial DMB antenna (not illustrated) for receiving broadcast, one or a plurality of microphones (not illustrated), and the like may be disposed. The DMB antenna 141a may be fixed on the device 100, or may be formed to be detachable.

Referring to FIG. 5, on an upper portion of a back side 100c of the electronic device 100, the second camera 152, a flash 153, and a microphone 162 may be disposed.

The connector 165 may be formed on a lateral side of a lower end of the electronic device 100. A plurality of electrodes may be formed on the connector 165, and may be wiredly connected to an external device. On a lateral side of an upper end of the electronic device 100, an earphones connection jack 167 may be formed. The earphones may be inserted into the earphones connection jack 167.

Also, an insertion hole 201 to which the pen 200 that is formed independently from the electronic device 100 may be inserted may be formed on the lateral side of the lower end of the electronic device 100. The pen (or an input unit) 200 may be inserted into the pen insertion hole 201. The pen (or input unit) 200 may also include a button 210. The button 210 may enable an erasing figure of the pen (or input unit) 200.

Next, a process of providing a user interface according to an exemplary embodiment will be described.

Figure 6:
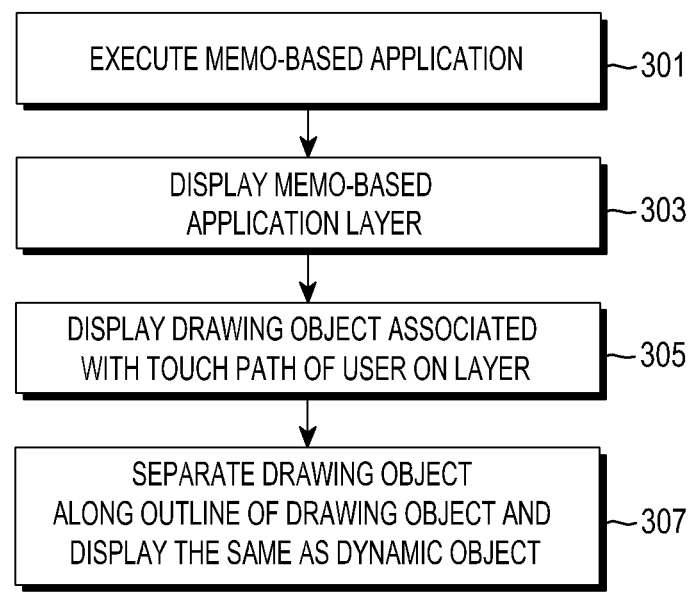
FIG. 6 is a flowchart illustrating a process of displaying a drawing object associated with a user input in three dimensions (3D) according to an exemplary embodiment.

FIG. 6 is a flowchart illustrating a process of general operations of displaying a drawing object associated with a user input, in three dimensions.

Referring to FIG. 6, the drawing object indicates a figure, such as a point, a line, and a face, which may be displayed on the touch screen 190 based on a path of a touch input when a user provides successive touches on the touch screen 190 using an input unit such as the pen 200.

The controller 110 executes an application in response to a request of a user in step S301. The application supports a drawing function that displays a drawing object associated with a path of successive touch inputs input through an input unit such as the pen 200 and the like. For example, the application may be a memo application, an instant messaging service application, a short message application, a diary application, an e-mail application, an SNS application, a photographing application, and an image editing application.

The controller 110 controls the touch screen controller 195 so that an execution screen of the application is displayed on the touch screen 190 as the application is executed, in step S303. In this example, the execution screen may include a layer for displaying the drawing object associated with the path of the successive touch inputs.

In step S305, the controller 110 enables the drawing object associated with the touch path of the user to be displayed on the execution screen. For example, when the user draws a circle on the touch screen 190 using the pen 200, a drawing object having a figure and a size corresponding to the circle drawn by the user may be displayed on the execution screen.

Subsequently, in step S307, the controller 110 performs a control to display a visual effect for an outline of the drawing object. In other words, the controller 110 controls the touch screen controller 195 so that the drawing object is separated along the outline of the drawing object, and is displayed as a dynamic object. In this example, the controller 110 may control the touch screen controller 195 so as to express, as a graphic, a process in which the drawing object is separated from a drawing screen and moves.

For example, when the drawing object is a circle, separation of the circular drawing object from the screen may be expressed as if a circle is cut out of a paper. In this example, since the drawing object is a circle, when the drawing object is separated along the outline of the drawing object, the drawing object may be independently separated. The process of separating the drawing object or the independently separated drawing object may be modeled and may be expressed to be stereoscopic and dynamic.

The process in which the drawing object is separated and moves may be expressed in various ways. For example, it may be expressed as if the drawing object is separated at once or as if the drawing object is cut out along an outline of the drawing object. Also, it may be expressed as if the independently separated drawing object moves from an initially displayed position to another position. For example, it may be displayed as if a cut circle is blown away or as if the cut circle is crumpled and thrown.

As another example, when the drawing object is a curve, separation of the drawing object in a form of a curve may be expressed as if a paper is cut along the drawn curve. In this example, the drawing object is a line and thus, the drawing object may not be independently separated from the screen and thus, the separated drawing object may be expressed in a 3D pop-up book scheme.

As described above, based on whether the drawing object corresponds to a closed pattern such as a circle or an open pattern such as a curve, expression of the drawing object cut out from a layer may be different.

Therefore, according to an exemplary embodiment, whether the drawing object corresponds to an open pattern or a closed pattern may be determined and a different function may be performed based on a type of pattern. The open pattern is formed of a line that may not intersect such as a straight line or a curve. The closed pattern has an area formed by a line that meets or intersects such as various polygons and a circle.

According to an exemplary embodiment, when a drawing object of the open pattern is displayed, the drawing object cut along an outline of the drawing object may be displayed based on a 3D pop-up book scheme.

When a drawing object of the closed pattern is displayed, a 3D expression that represents an effect as if the drawing object is separated from a screen is provided and a sub-application is called so that the antecedent application and the sub-application may be simultaneously executed. In other words, execution of the antecedent application is maintained and the sub-application is executed inside an area formed by the outline of the drawing object so that a process of execution of the sub-application may be displayed inside the area.

The sub-application called by the drawing object of the closed pattern may be determined in advance. For example, any closed pattern may call the sub-application that is determined in advance.

Also, a sub-application may be designated for each shape of the closed pattern. For example, for a quadrangular closed pattern, an image library application may be designated. For a circular closed pattern, an image capturing application is designated. For a triangular closed pattern, a map application may be designated.

Also, a list of sub-applications that may be called to correspond to the drawing object of the closed pattern may be provided, and an application selected by the user from among the provided sub-applications may be called.

A type of a sub-application to be called may be designated by the user. For example, the sub-application may be an image library application, an image capturing application, a map application, and the like.

In the embodiment of FIG. 6, descriptions have been provided by assuming the case in which one sub-application is designated for a drawing object of a closed pattern irrespective of a shape of the drawing object. Hereinafter, for helping understanding of one or more exemplary embodiments, an antecedent application is referred to as a first application and a sub-application is referred to as a second application.

Figure 7:
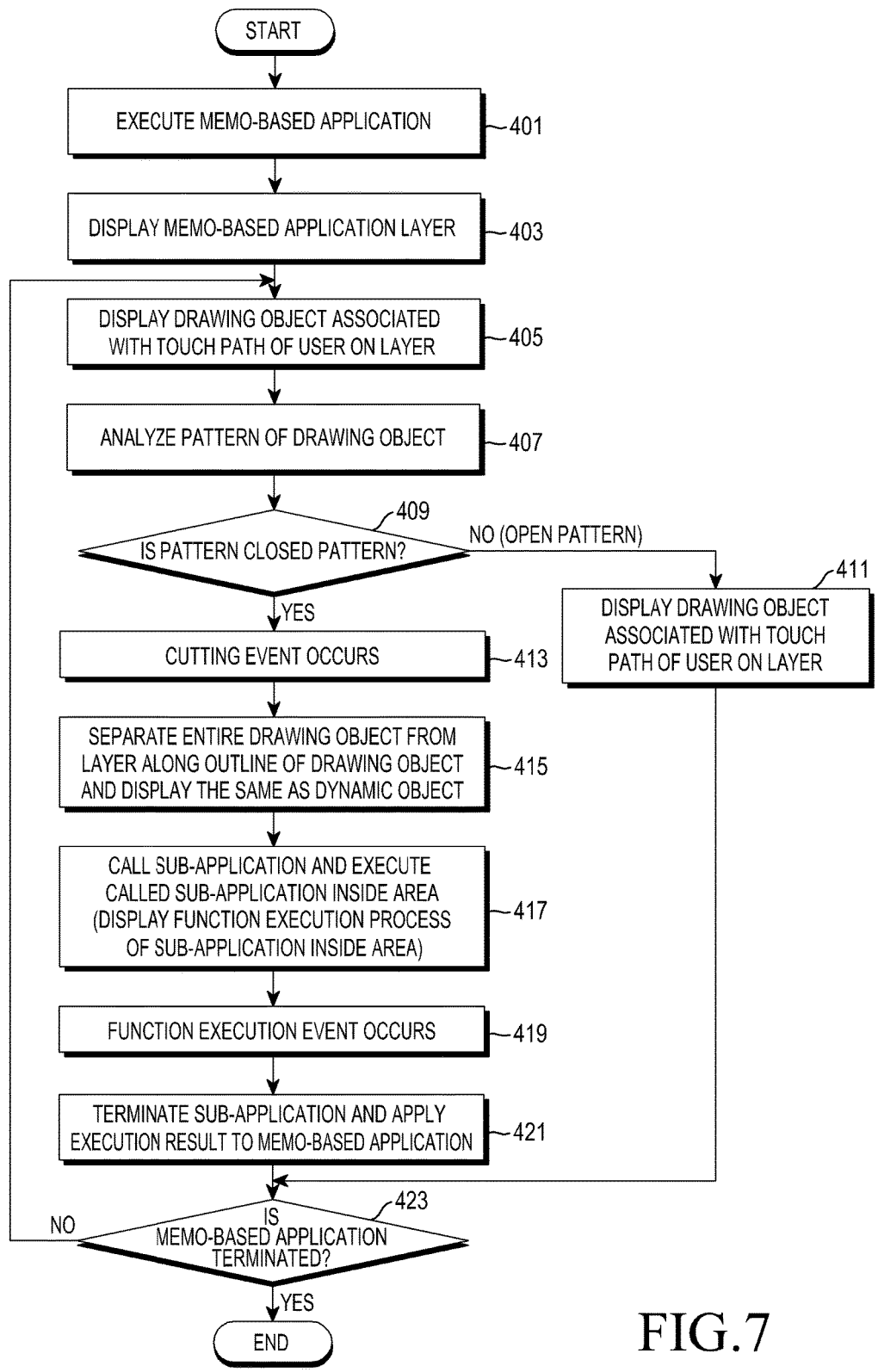
FIG. 7 is a flowchart illustrating a process of displaying a drawing object in 3D based on a type of a pattern of the drawing object, and executing an associated application according to an exemplary embodiment.
Figure 8:
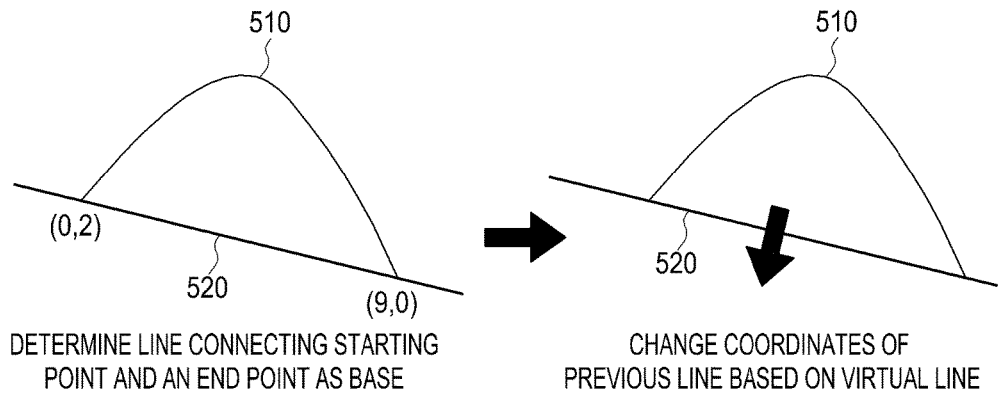
FIG. 8 is a diagram illustrating a process of expressing an open drawing object according to an exemplary embodiment.
Figure 9:
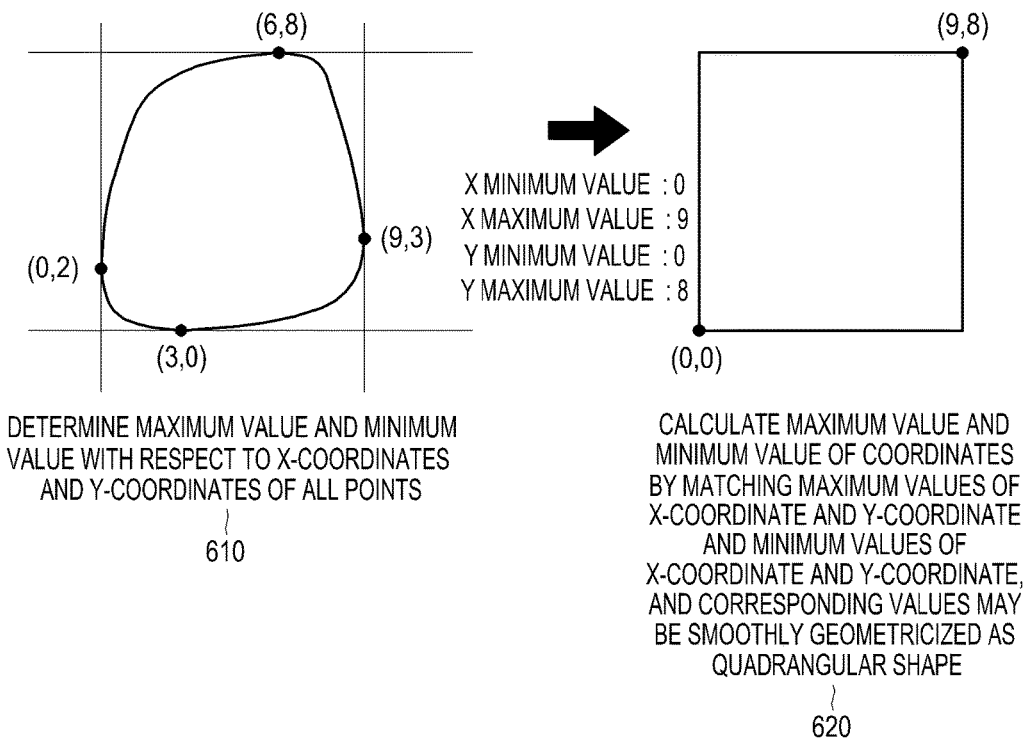
FIG. 9 is a diagram illustrating a process of standardizing a closed drawing object according to an exemplary embodiment.

FIG. 7 is a flowchart illustrating a process of displaying a drawing object based on a type of a pattern of the drawing object, and executing an associated application, FIG. 8 is a diagram illustrating a process of expressing an open drawing object according to an exemplary embodiment, and FIG. 9 is a diagram illustrating a process of standardizing a closed drawing object according to an exemplary embodiment.

Hereinafter, a process of operations of an electronic device according to another exemplary embodiment will be described with reference to FIGS. 7 through 9.

Referring to FIG. 7, the controller 110 executes a first application, and performs a control to display an execution screen of the first application in steps S401 and S403.

In step S405, the controller 110 performs a control to display a drawing object associated with a touch path on an execution screen when a touch input of a user occurs. When the touch input of the user is interrupted, the controller 110 determines that input of the drawing object is completed and proceeds with step S407.

The controller 110 analyzes a pattern of the drawing object, and determines whether the pattern is an open pattern or a closed pattern in steps S407 and S409. When the drawing object is formed of a line that does not intersect or a line of which a starting point and an end point do not meet, it is determined that a pattern of the corresponding drawing object is an open pattern. When a pattern of a drawing object forms an area by a line that meets or intersects, it is determined that the pattern is a closed pattern.

When the drawing object is an open pattern in step S409, the controller 110 controls the touch screen controller 195 so that the drawing object is separated along an outline of the drawing object and the separated drawing object is expressed based on a 3D pop-up book scheme in steps S409 and S411. Also, when the drawing object is an open pattern, the controller 110 may display the drawing object associated with the touch path of the user on a layer.

As described above, FIG. 8 illustrates an example of a process that expresses a drawing object of an open pattern as a 3D object based on a pop-up book scheme.

Referring to FIG. 8, a virtual line 520 that connects a starting point having coordinates (0, 2) and an end point having coordinates (9, 0) in a straight line may be determined as a base for a drawing object 510 of a closed pattern. The drawing object 510 may be displayed by changing, based on the virtual line 520, respective coordinates of a plurality of points forming the drawing object 510, that is, coordinates of points on an outline of the drawing object 510, by the same variation and thus, the drawing object 510 may be expressed in dynamic 3D.

When the result of the analysis is a closed pattern, the controller 110 determines whether a cutting event occurs with respect to the drawing object in step S413. The cutting event may occur in response to a user input. For example, the cutting event may occur when input of drawing by the user is interrupted. As another example, as the user touches an area formed along the outline of the drawing object after input of the drawing is interrupted, the cutting event may occur. As another example, the cutting event may occur when the user selects a cutting menu.

When the cutting event occurs, the controller 110 performs a control to independently separate the entire drawing object along the outline of the drawing object and to display the drawing object as a dynamic object in step S415.

Subsequently, the controller 110 calls a second application designated for the drawing object of the closed pattern, and executes the second application inside the area formed by the drawing object. The controller 110 performs a control to display, inside the area, an execution screen of the second application associated with a user input in step S417.

According to an exemplary embodiment, a form of an area where a sub-application is executed may keep a form of a drawing object drawn by the user as it is. According to another exemplary embodiment, the form of the area may be standardized to a quadrangular shape. An example of standardizing the form of the area where the second application is executed to the quadrangular shape is illustrated in FIG. 9.

Referring to FIG. 9, a maximum value and a minimum value with respect to X-coordinates and Y-coordinates of all points in an outline are determined with respect to the closed drawing object 610, a maximum value and a minimum value of coordinates may be calculated by matching maximum values of an X-coordinate and a Y-coordinate and minimum values of an X-coordinate and a Y-coordinate, and the corresponding values may be smoothly geometricized 620 as a quadrangular shape.

Referring again to FIG. 7, when a function execution event occurs in response to a function execution request of the user, the controller 110 applies an execution result of the second application to the first application in steps S419 and S421, and determines termination of the second application in step S423. In other words, the execution result of the second application may be converted into input data with respect to the first application.

For example, the controller 110 may perform a control so that an image including the execution result of the second application at a point in a time when the function execution event occurs is included in the execution screen of the first application as an input image of the first application.

Also, when the first application is not terminated, the process returns to step S405 and displays a drawing object associated with a touch path of the user on a layer in step S405.

Figure 10:
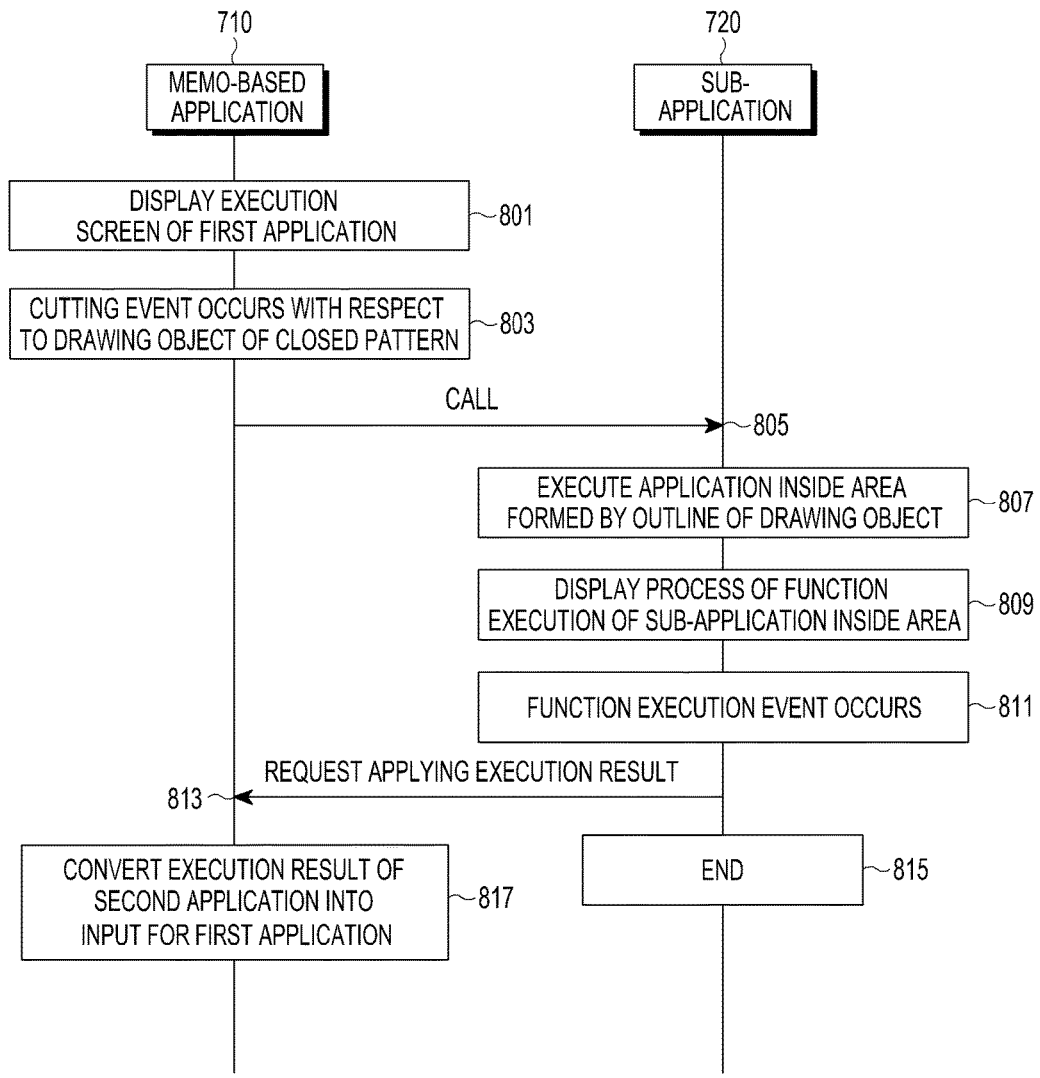
FIG. 10 is a flowchart illustrating a process of operations between two applications according to an exemplary embodiment.

The function execution event may occur in response to a selection input by the user for selecting a function execution menu, or may occur in response to a user input of a predetermined gesture. FIG. 10 illustrates a process of processing each application when the first application and the second application work together.

FIG. 10 is a flowchart illustrating a process of operations between two applications according to an exemplary embodiment.

Hereinafter, a process of operations between two applications according to an exemplary embodiment will be described with reference to FIG. 10.

Referring to FIG. 10, a first application 710, for example, a memo-based application, displays an execution screen of the first application 710 in step S801. As a cutting event occurs with respect to a drawing object of a closed pattern, the first application 710 may call a second application 720, for example, a sub-application, in steps S803 and S805.

In response to the calling from the first application 710, the second application 720 is executed inside an area formed by an outline of a drawing object in step S807. An execution process of the second application 720 may be displayed inside the area in response to an input of the user in step S809. Subsequently, when a function execution event occurs in response to a user input, applying of an execution result to the first application 710 is required in steps S811 and S813. The function execution event may occur, for example, when successive touch inputs starting from an area inside an outline of a drawing object and ending at the area of a drawing receiving application layer exist.

The first application 710 converts the execution result of the second application into an input for the first application in response to the request of the second application 720, and includes the input in the first application 710 in step S817.

When an operation of the first application 710 in step S817 is completed, the second application 720 may be terminated in step S815.

Hereinafter, according to an exemplary embodiment, a process in which two applications work together in the case in which the first application is an instant messaging service application and the second application is an image library application will be described.

FIGS. 11A through 11D are diagrams illustrating examples of controlling a user interface according to an exemplary embodiment.

Figure 11A:
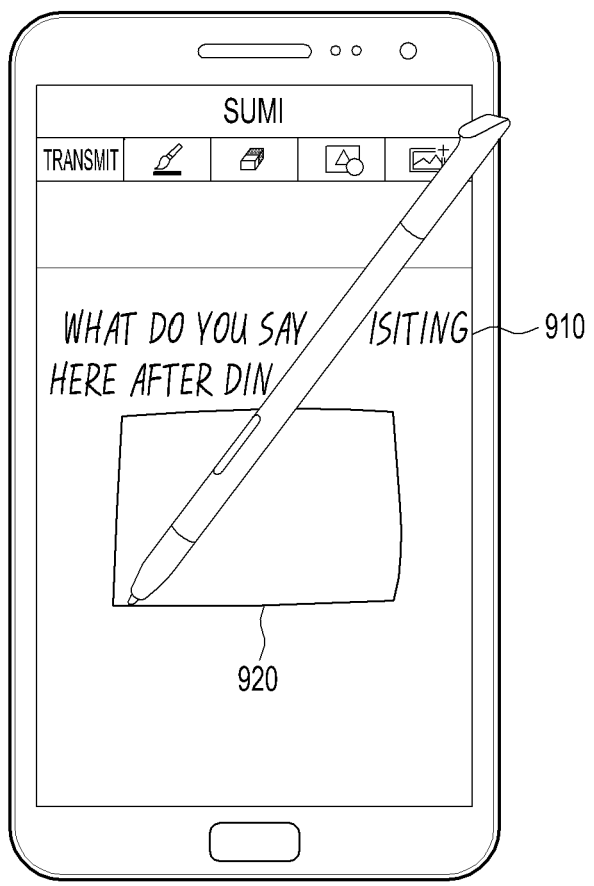
FIGS. 11A through 11D are diagrams illustrating examples of controlling a user interface according to an exemplary embodiment.

FIG. 11A illustrates a screen in which a quadrangular drawing object 920 is displayed in an execution screen 910 of an instant messaging service application as a user draws a figure in a quadrangular shape using the pen 200 in a state in which the execution screen 910 is displayed as the instant messaging service application is executed. When the user completes drawing a desired closed pattern, that is, a quadrangular shape, the user may take a gesture of clicking and removing a quadrangle using the pen 200.

Figure 11B:
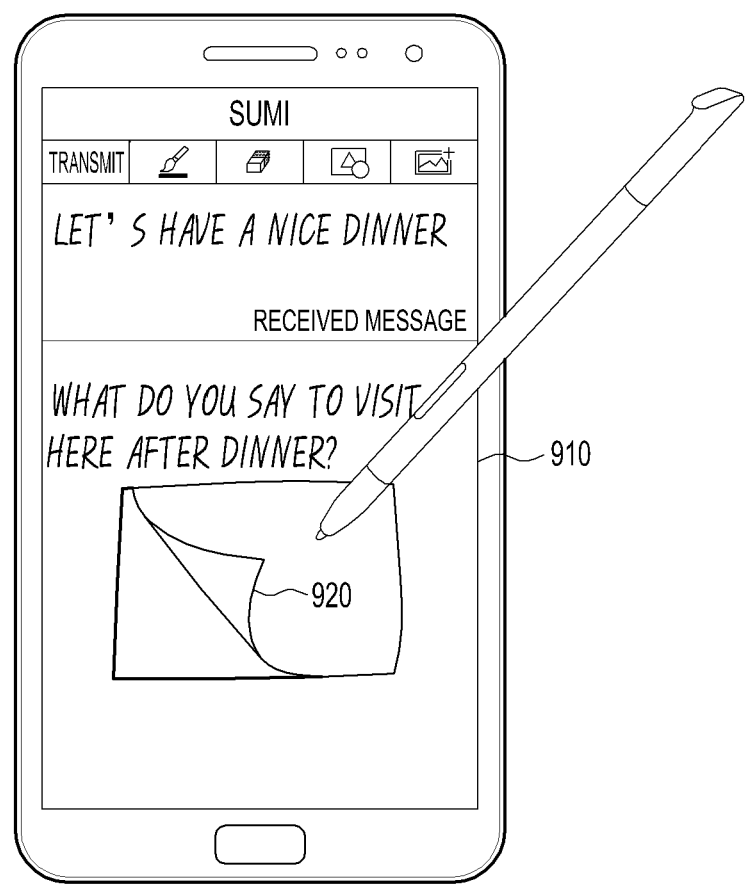

As the gesture of removing is input by the user, a cutting event occurs. As the cutting event is expressed as if a paper of a quadrangular shape is cut out and removed from the execution screen 910 as shown in FIGS. 11B and 11C, the controller 110 controls the quadrangular drawing object 920 to be displayed.

Figure 11C:
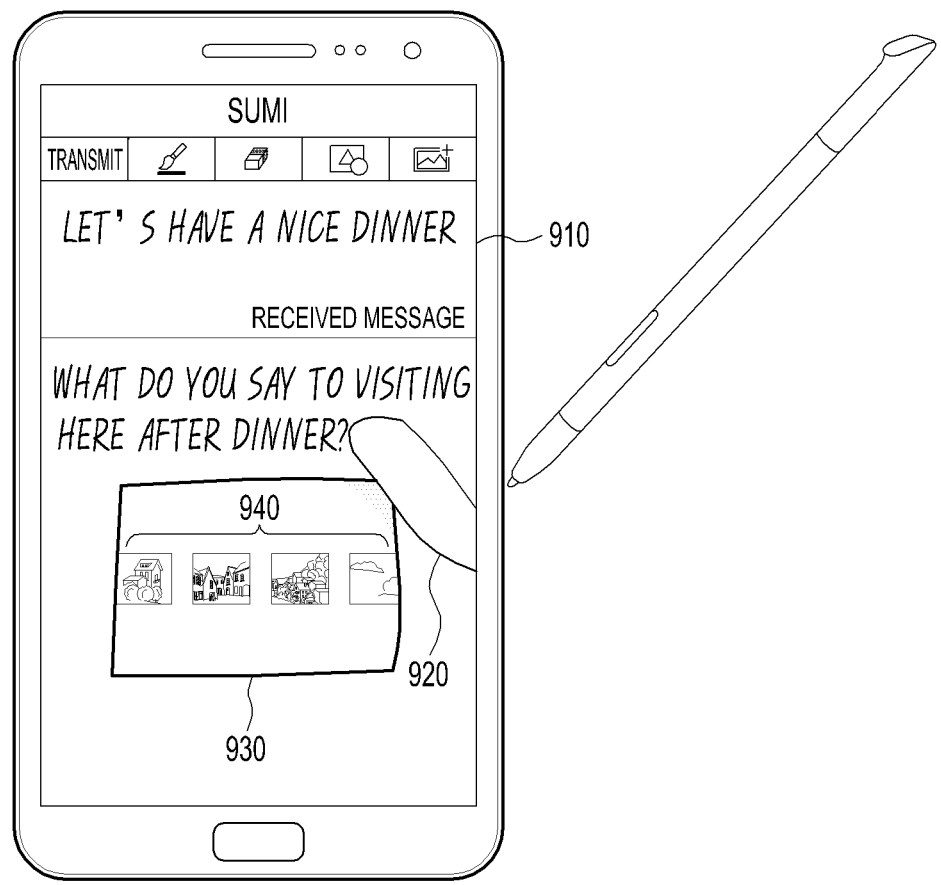

The controller 110 calls an image library application, and enables a thumbnail image list 940 corresponding to an image stored in an image library to be displayed inside an area 930 of the quadrangular drawing object 920, as illustrated in FIG. 11C. In other words, the image library application is executed inside the area 930, and an execution screen of the image library application is displayed in a form of the drawing object 920. In this example, the thumbnail image list 940 may be displayed as if it is gradually enlarged from a small size to a large size. The user may select a desired image by touching the execution screen of the image library and performing a drag on the thumbnail image list.

Figure 11D:
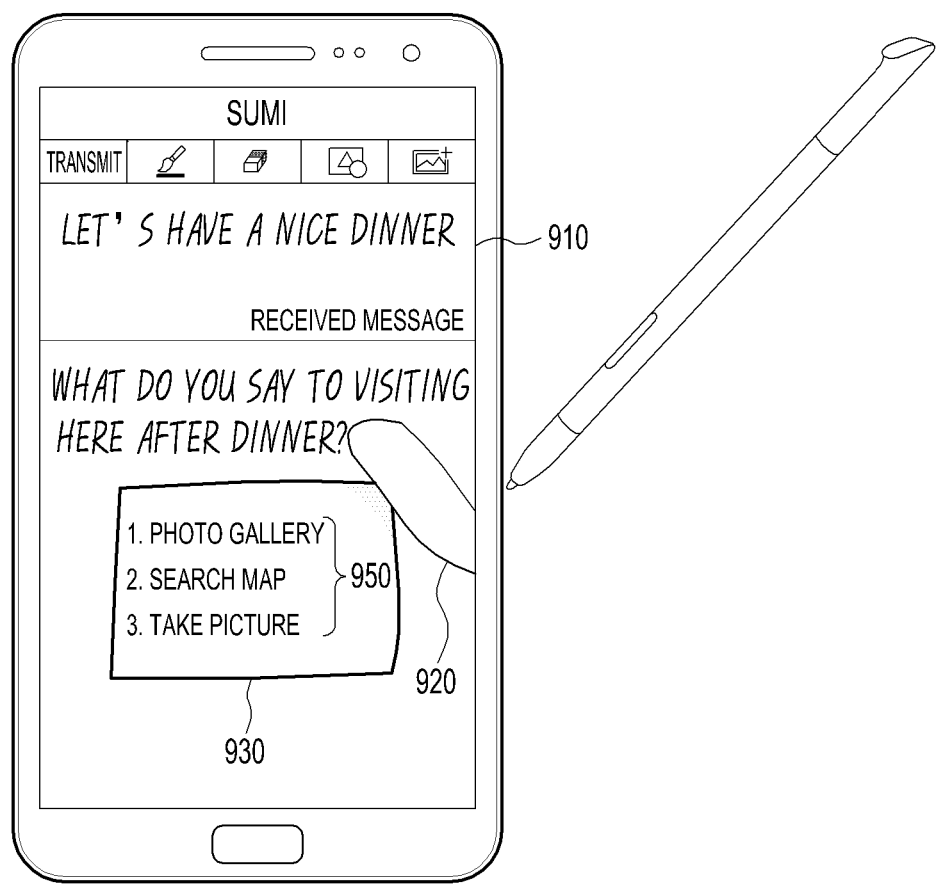

According to another exemplary embodiment, as displayed in FIG. 11D, as the drawing object 920 of the closed pattern is detected, and the cutting event occurs, a list 950 of sub-applications that may be called may be displayed inside the area 930. The user checks the sub-application lists, and selects an image library application so as to call the image library application.

Figure 12A:
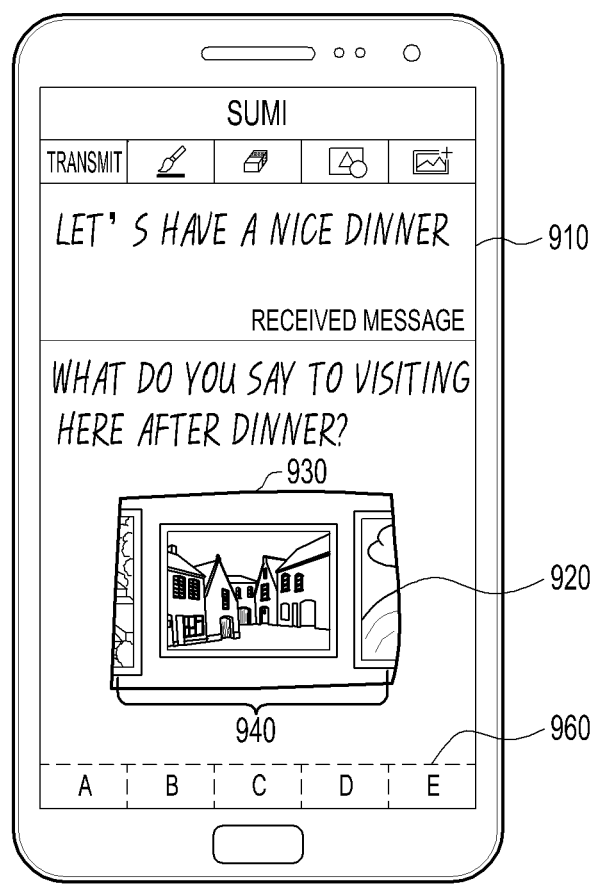
FIGS. 12A through 12F are diagrams illustrating examples of controlling a user interface according to another exemplary embodiment.

As the image library application is called, the thumbnail image list 940 may be displayed inside the area 930 of the drawing object 920 in an appropriate size so as to secure a visibility for the user. FIG. 12A illustrates an example in which an image library application is called and the thumbnail image list 940 is appropriately mapped inside the area 930 of the quadrangular drawing object 920. In addition, when calling of the image library application is completed, a menu list 960 associated with a function provided from the image library application may be provided. The user may select a desired image by touching the inside of the area 930 of the quadrangular drawing object 920, and performing a drag on the thumbnail image list 940. Also, the user may select a desired function menu from the menu list 960. The controller 110 may enable a process and a result of operations of the image library application in response to an input of the user to be continuously displayed in the area 930.

FIGS. 12A through 12F are diagrams illustrating examples of controlling a user interface according to another exemplary embodiment.

Figure 12B:
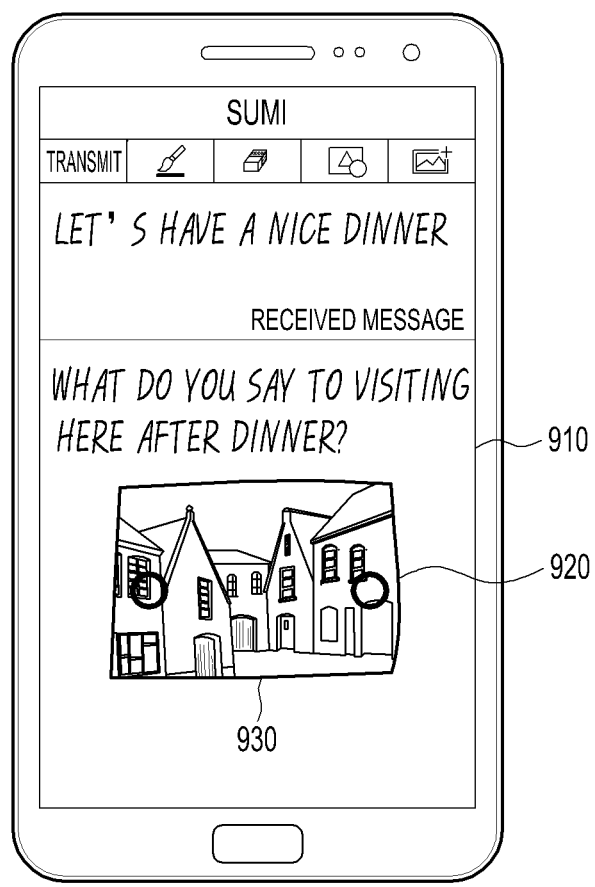
Figure 12C:
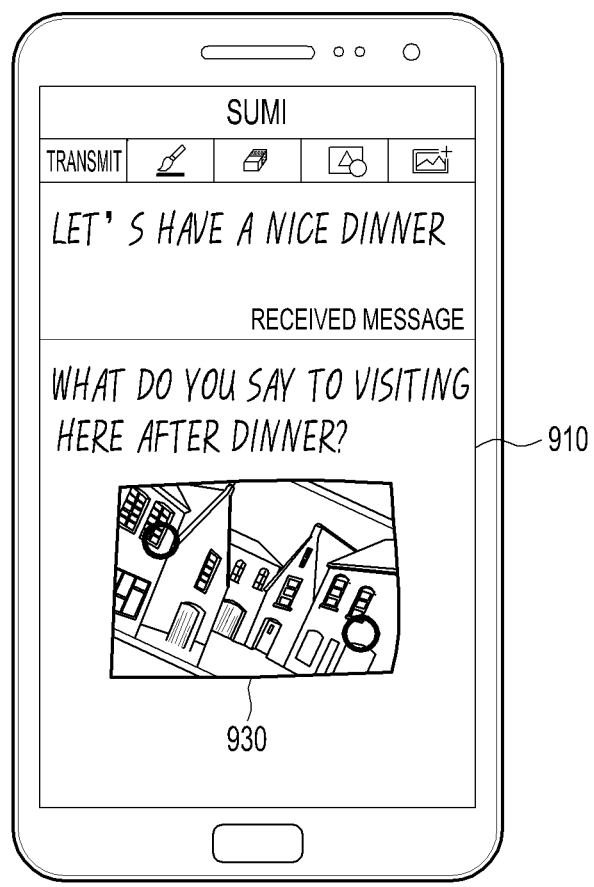

The image selected by the user is mapped to the inside of the area 930 of the quadrangular drawing object 920, as illustrated in FIG. 12B. The user may input a request for editing the mapped image, such as rotating, enlarging, or reducing. In response to the request for editing, as illustrated in FIG. 12C, the controller 110 may enable a process of rotating, reducing, or enlarging the image to be displayed in the inside of the area 930 of the quadrangular drawing object.

Figure 12D:
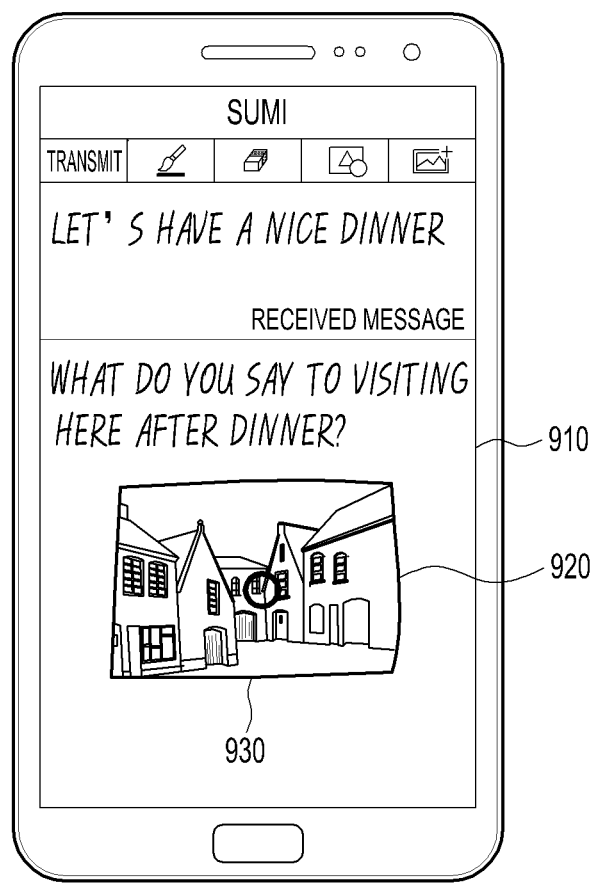
Figure 12E:

Subsequently, as illustrated in FIG. 12D, when a selection complete request with respect to a displayed image is input by the user, the controller 110, at a point in time when the selection complete request is input, crops the displayed image along the outline of the drawing object 920 so as to generate an input image with respect to the instant messaging service application, and includes the input image in the instant messaging service application. When the user selects a transmission menu of the instant messaging service application, the generated image 970, that is, the cropped image, may be transmitted to a partner of the instant messaging service, as illustrated in FIG. 12E.

Figure 12F:

According to another exemplary embodiment, when the user selects an image in a state in which the thumbnail image list 940 is displayed as illustrated in FIG. 12A, the selected image may be displayed on the execution screen 910 as illustrated in FIG. 12F.

Figure 13A:
FIGS. 13A through 13C are diagrams illustrating examples of displaying a drawing object of an open pattern as a dynamic 3D object according to an exemplary embodiment.
Figure 13B:
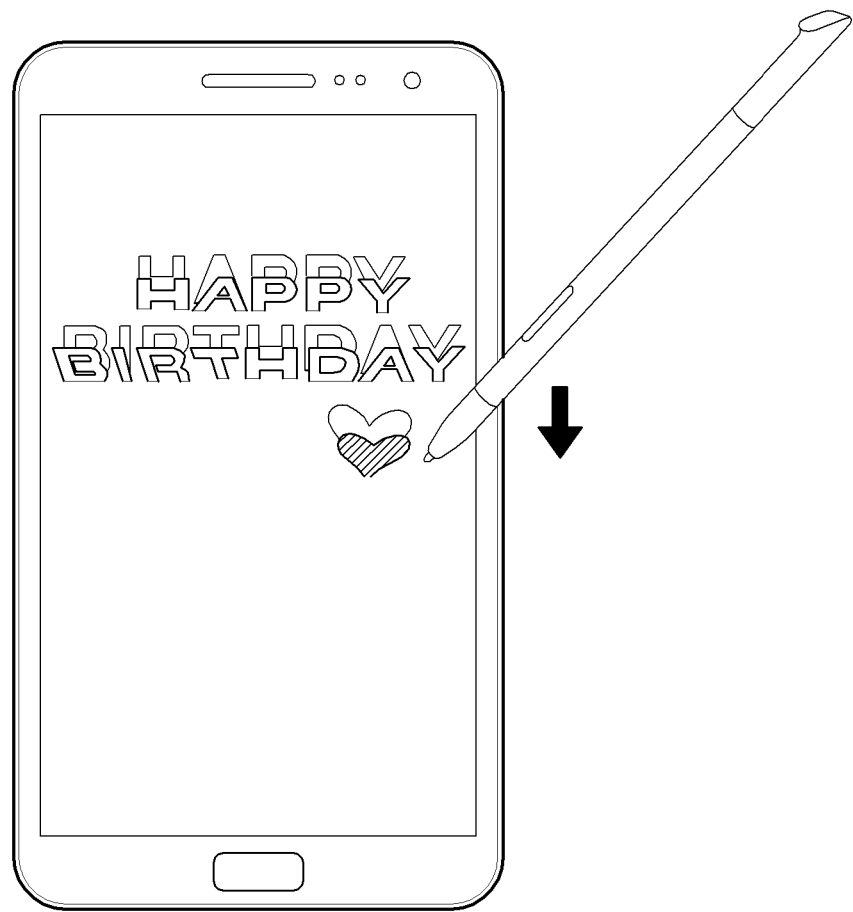
Figure 13C:

FIGS. 13A through 13C are diagrams illustrating examples of displaying a drawing object of an open pattern as a dynamic 3D object according to an exemplary embodiment.

In FIG. 13A, in a state in which a memo application is executed, as a drawing object of an open pattern corresponding to a phrase "HAPPY BIRTHDAY" is drawn, the phrase "HAPPY BIRTHDAY" is already expressed as a 3D pop-up book scheme. A user may draw a heart shape of which a predetermined portion is opened, on the touch screen 190. Accordingly, when a touch input of the user is interrupted, the controller 110 may determine whether the drawing object in the heart shape is an open pattern or a closed pattern. When the drawing object is a closed pattern, the drawing object in the heart shape may be independently separated from a layer of the memo application. However, when the drawing object is an open pattern, the controller 110 cuts the drawing object in the heart shape along an outline, and displays the drawing object based on a 3D pop-up book scheme, as illustrated in FIG. 13B. Subsequently, as the user performs a drag on a screen of a drawing receiving application, the drawing object in the heart shape may be expressed as if the drawing object moves up and down as shown in FIGS. 13B and 13C.

Figure 14A:
FIGS. 14A and 14B are diagrams illustrating a first example of controlling a user interface according to another exemplary embodiment.
Figure 14B:
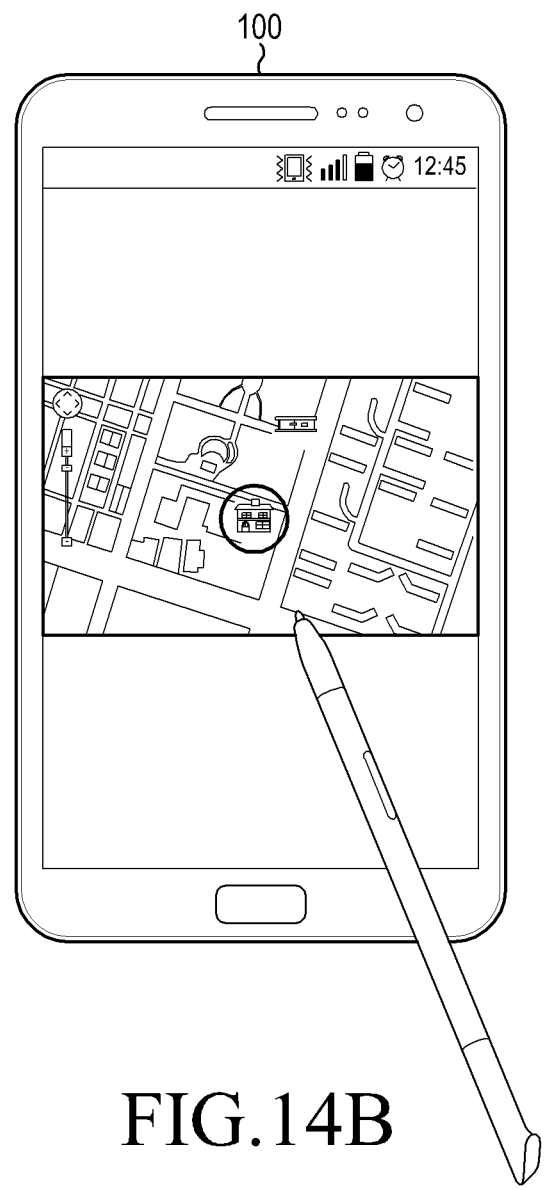

FIGS. 14A and 14B are diagrams illustrating a first example of controlling a user interface according to another exemplary embodiment.

FIG. 14A illustrates a case in which a sub-application that works together with an instant messaging service application is a map application according to another exemplary embodiment. When the sub-application is a map application, the controller 110 calls a map application, and controls the map application to be executed inside the area 930 formed by the closed drawing object. Accordingly, the map image may be displayed inside the area 930. In other words, the map image is displayed in a form of the area 930 formed by the drawing object. In this example, together with the map image, a user interface for controlling the map application may be displayed. The user may input an enlarging instruction, a reducing instruction, a moving instruction and the like on the displayed map, and a process of executing the instruction and a result thereof may be displayed inside the area 930. When a function execution request occurs with respect to the map application, a map displayed at the time when the function execution request occurs is cropped along the outline of the drawing object, and an input image with respect to the instant messaging service application may be generated. The generated input image may be included in the instant messaging service application. In other words, the map image cropped to have a form identical to the area 930 from an original map image is included in the instant messaging service application as an input image. As per a transmission request of the user, the cropped image may be transmitted to a partner.

According to another exemplary embodiment, when the user selects a value of a result of the map application applied to the instant messaging service application, that is, the cropped map image, the original map image corresponding to the cropped map may be provided as illustrated in FIG. 14B. Also, the original map image may be transmitted to the partner together with the captured map image.

Figure 15A:
FIGS. 15A through 15C are diagrams illustrating a second example of controlling a user interface according to another exemplary embodiment.
Figure 15B:
Figure 15C:

FIGS. 15A through 15C are diagrams illustrating a second example of controlling a user interface according to another exemplary embodiment.

FIGS. 15A and 15B illustrate a case in which a sub-application that works together with an instant messaging service application is an image capturing application according to another exemplary embodiment. As displayed in FIG. 15A and FIG. 15B, when an image capturing application is called as the drawing object 920 of a closed pattern is detected and a cutting event occurs, the controller 110 may activate a camera and may display a preview image captured through the camera on the area 930 of the drawing object as illustrated in FIG. 15A. A user may input a zoom-in request, a zoom-out request, a capturing request, and the like. When the capturing request is input, the controller 100 displays a captured image on the area 930. The user may input a rotation request or an enlarging/reducing request with respect to the captured image, and an execution screen thereof is displayed on the area 930.

When a function execution request with respect to the image capturing application is obtained from the user, the controller 110 crops an image displayed at a point in time when the function execution request occurs, along an outline of the area 930, and generates an input image 980 for the instant messaging application service, and includes the input image in the instant messaging application, as illustrated in FIG. 15B.

Also, according to another exemplary embodiment, when the function execution request with respect to the image capturing application is obtained from the user, the controller 110 includes an original captured image in the instant messaging application, as illustrated in FIG. 15C.

Figure 16A:
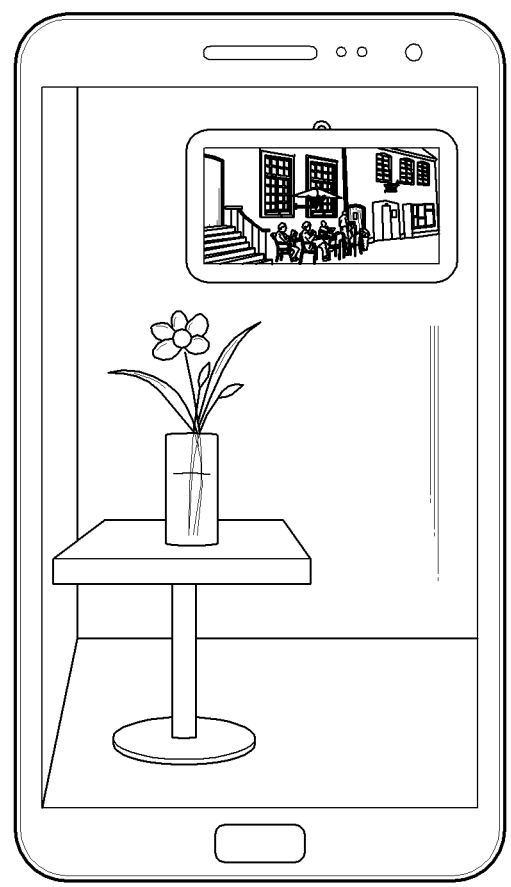
FIGS. 16A through 16C are diagram illustrating a third example of controlling a user interface according to another exemplary embodiment.
Figure 16B:
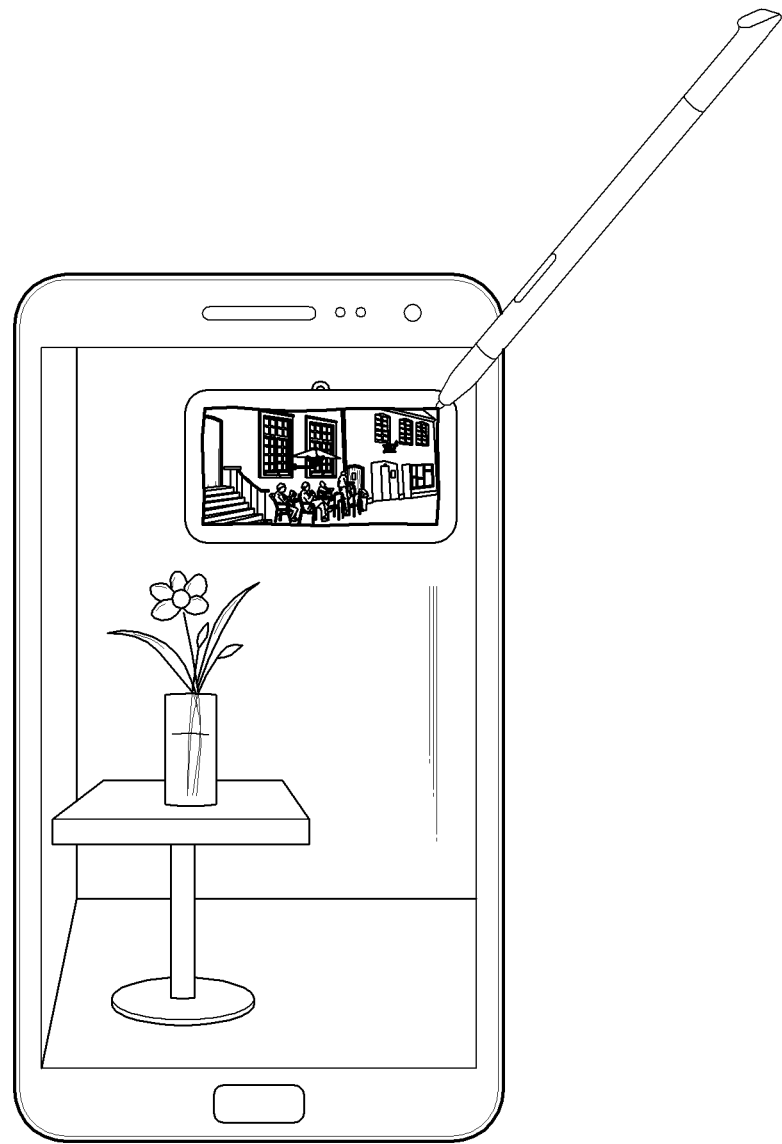
Figure 16C:
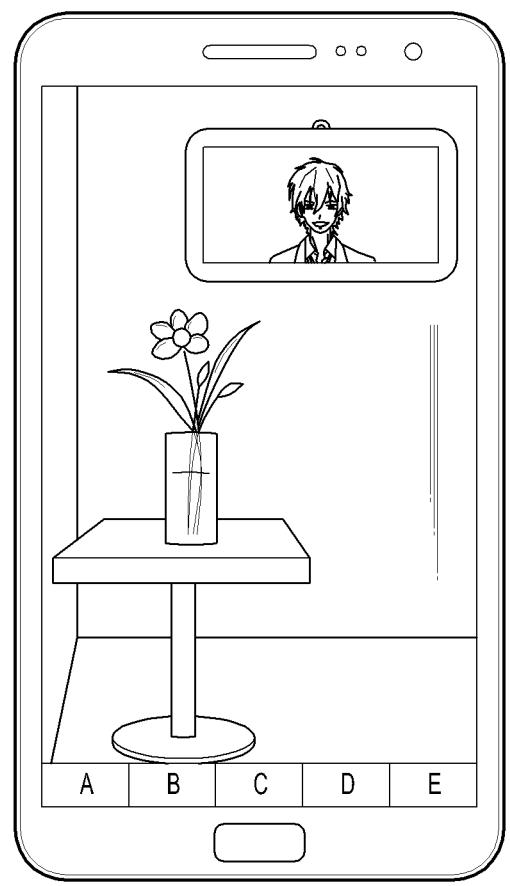

FIGS. 16A through 16C are diagrams illustrating a third example of controlling a user interface according to another exemplary embodiment.

FIG. 16A through FIG. 16C illustrate a case in which a first application is an image library application and a second application is an image capturing application. FIG. 16A illustrates a state in which an image selected by a user from among a plurality of images provided by an image library application is displayed. In this example, the image library application also provides a drawing layer. As illustrated in FIG. 16B, the user may draw a closed quadrangular drawing object on a picture frame portion of the displayed image. Accordingly, the image library application calls an image capturing application so as to activate a camera, and displays a preview image captured through the camera on the picture frame (drawing object), as illustrated in FIG. 16C. The user may input a capturing instruction through a key input and the like. Therefore, the captured image is cropped along an outline of the quadrangular drawing object and is included in the selected image.

In the above descriptions of one or more exemplary embodiments, descriptions have been provided by exemplifying the case in which two different applications work together. According to another exemplary embodiment, in a state in which one application is executed, a first area formed by a drawing object generated by a user input and a second area remaining after excluding the first area may provide application functions different from each other. The present embodiment assumes the case in which a pattern of a drawing object is a closed pattern, which will be described with reference to FIG. 17.

Figure 17:
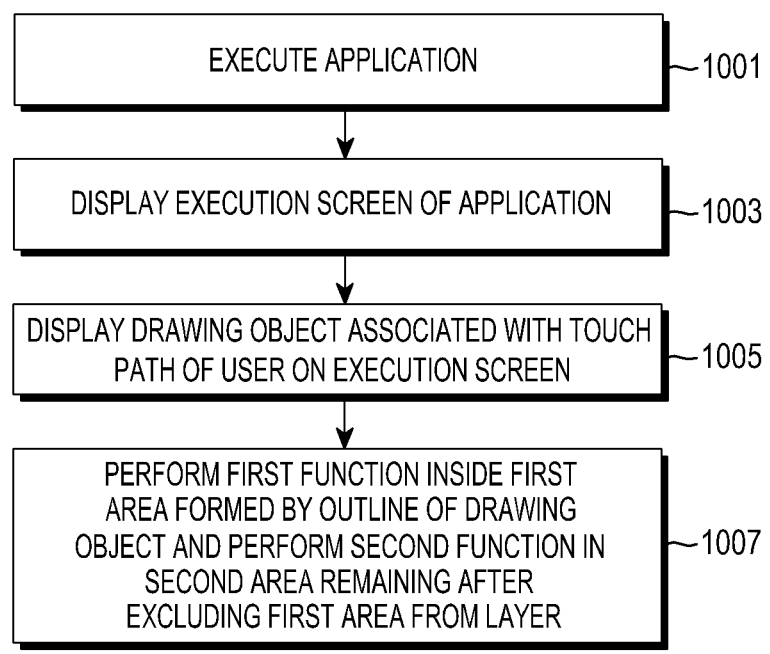
FIG. 17 is a flowchart illustrating a process of operations of an electronic device according to another exemplary embodiment.

FIG. 17 is a flowchart illustrating a process of operations of an electronic device according to another exemplary embodiment.

Hereinafter, a process of operations of an electronic device according to another exemplary embodiment will be described with reference to FIG. 17.

Referring to FIG. 17, the controller 110 executes an application in response to a user request, and controls the touch screen controller 195 so that an execution screen of the application is displayed on the touch screen 190, in steps S1001 and S1003.

The controller 110 displays a drawing object associated with a touch path of the user on the execution screen in step S1005. The controller 110 detects a closed drawing object, and controls the touch screen controller 195 so that the drawing object is separated from a layer along an outline of the drawing object, and is displayed as a dynamic object. The controller 110 may control the touch screen controller 195 so as to express, as a graphic, a process in which the drawing object is separated from the drawing layer and moves. The graphic may be a 3D graphic.

Subsequently, the controller 110 performs a control so as to perform a first function inside a first area formed by the outline of the drawing object and to perform a second function in a second area remaining after excluding the first area from the drawing layer in step S1007.

For example, the second function executed in the second area may be a function that is provided by the application before the drawing object is generated, and the first function executed in the first area may be a predetermined function. Also, the second function executed in the second area may be a function that is provided by the application before the drawing object is generated, and a function menu list that may be executed in the first area is provided to the user when the drawing object is separated and a selected function by the user from the menu list may be performed in the first area. Also, function menu lists respectively applicable to the first area and the second area may be provided, and functions selected by the user from the function menu lists may be applied to corresponding areas, respectively.

Figure 18A:
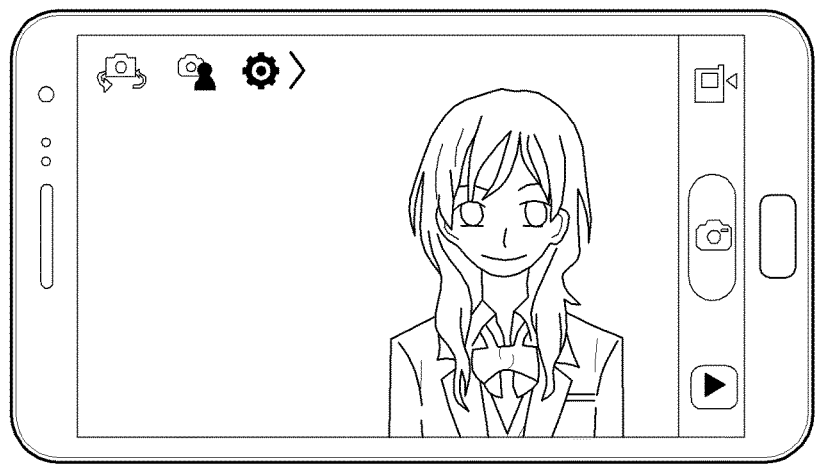
FIGS. 18A through 18C are diagrams illustrating a fourth example of controlling a user interface according to another exemplary embodiment.
Figure 18B:
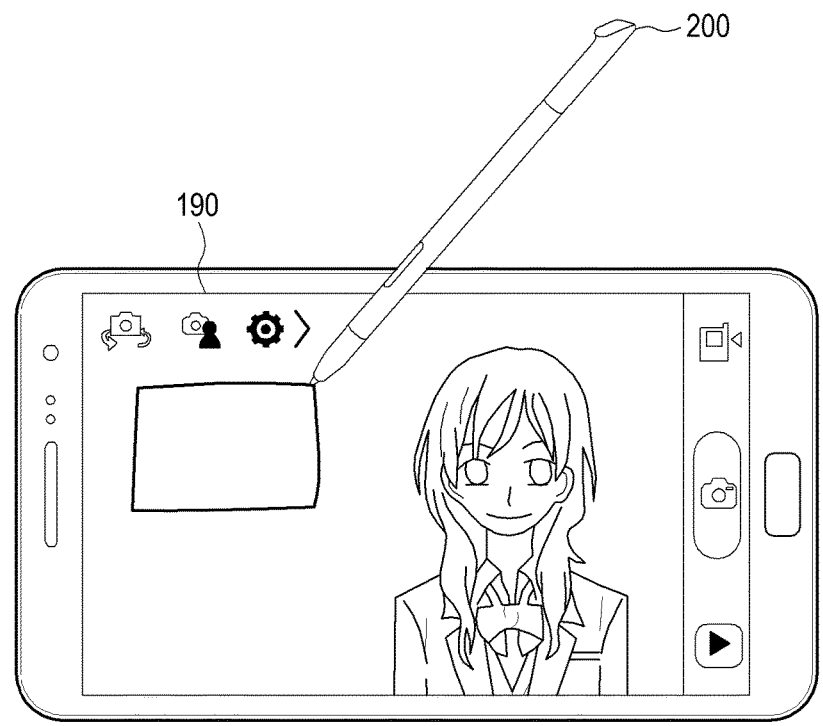
Figure 18C:
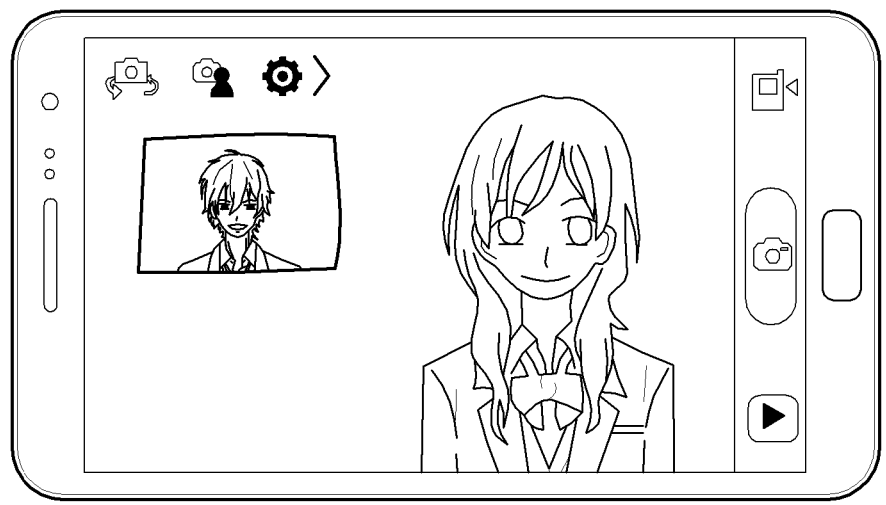

FIGS. 18A through 18C are diagrams illustrating a fourth example of controlling a user interface according to another exemplary embodiment.

FIGS. 18A through 18C are diagrams illustrating a case in which an application function corresponding to the first area is a dual-camera function when an image capturing application is executed.

FIG. 18A illustrates a state in which the first camera 151 is activated as an image capturing application is executed, and a preview image obtained by capturing a first user is displayed. Subsequently, a user may draw a quadrangular drawing object on the touch screen 190 using a pen 200, as illustrated in FIG. 18B. When the user completes the drawing, the controller 110 determines that a closed quadrangular drawing object is detected and performs a control to display a graphic associated with the quadrangular drawing object. Simultaneously, the controller 110 activates the second camera 152 for executing the dual-camera function designated for the closed drawing object, and displays a preview image captured through the second camera 152 inside an area of the drawing object, as illustrated in FIG. 18C. In the embodiments of FIGS. 18A through 18C, the first area corresponds to a quadrangular area formed by the closed drawing object, and the second area is an area remaining after excluding the quadrangular area.

Figure 19A:
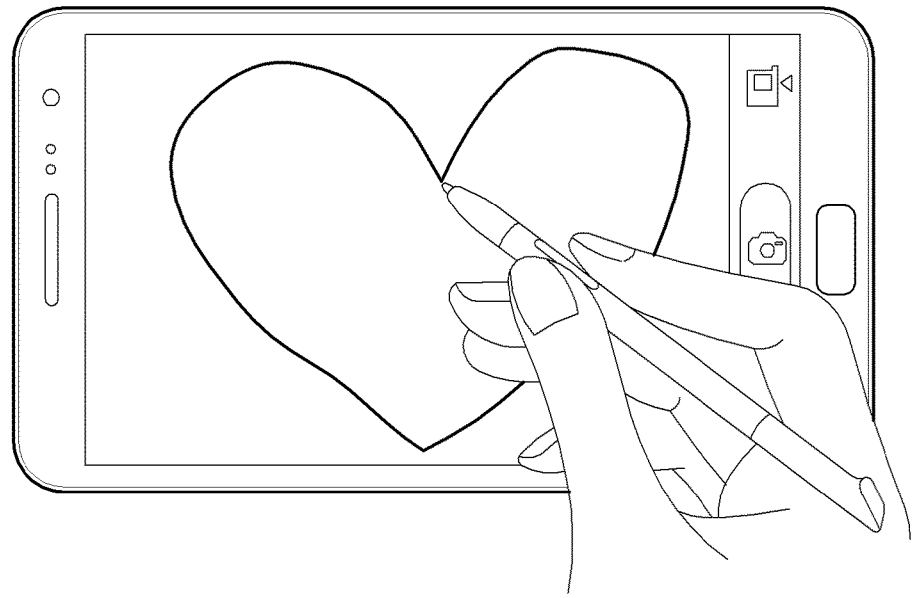
FIGS. 19A and 19B are diagrams illustrating a fifth example of controlling a user interface according to another exemplary embodiment.
Figure 19B:
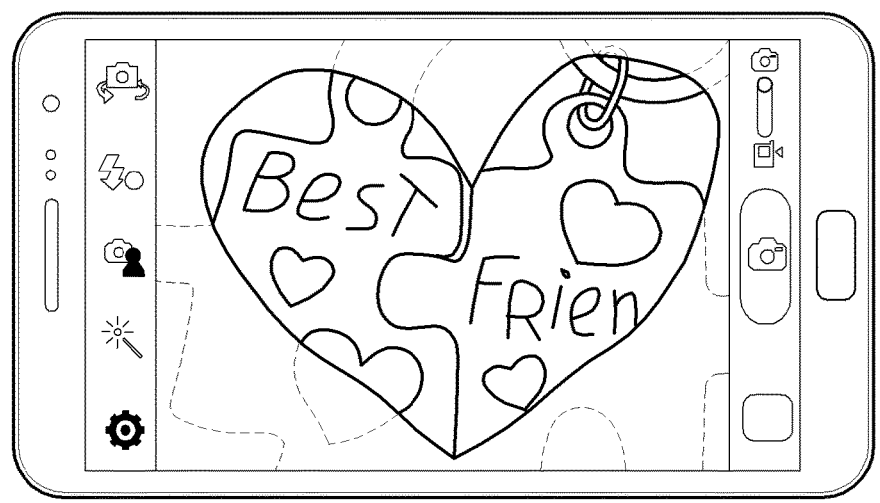

FIGS. 19A and 19B are diagrams illustrating a fifth example of controlling a user interface according to another exemplary embodiment.

FIGS. 19A and 19B illustrate a case in which an image capturing application respectively applies filter effects to a first area of a closed drawing object drawn by a user and to a second area remaining after excluding the first area from a drawing layer. The filter effect provides a change in a brightness, a chroma, a color, a focusing, and the like by adjusting each pixel value of an image.

As illustrated in FIG. 19A, the user may draw a closed drawing object in a heart shape, in a state in which an image capturing application is executed. When the user completes the drawing, the controller 110 determines that the closed drawing object in the heart shape is detected, and performs a control so as to display a graphic associated with a heart-shaped drawing object. At or about the same time, the controller 110 provides a filter effect list to provide a filter effect function designated for the closed drawing object. The user may select a filter effect to be applied to the heart area. In addition, the user may select a filter effect to be applied to an area remaining after excluding the heart area.

Accordingly, the controller 110 performs a control so as to display an image including the heart area and the remaining area excluding the heart area to which filter effects are applied, respectively, as illustrated in FIG. 19B.

Figure 20A:
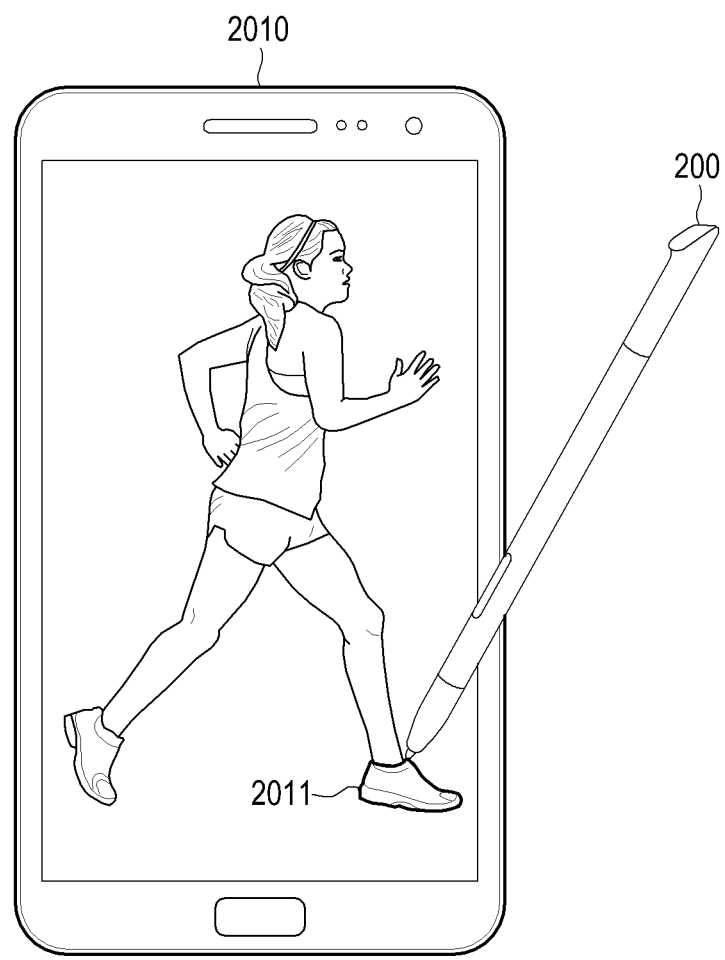
FIGS. 20A through 20C are diagrams illustrating a sixth example of controlling a user interface according to another exemplary embodiment.
Figure 20B:
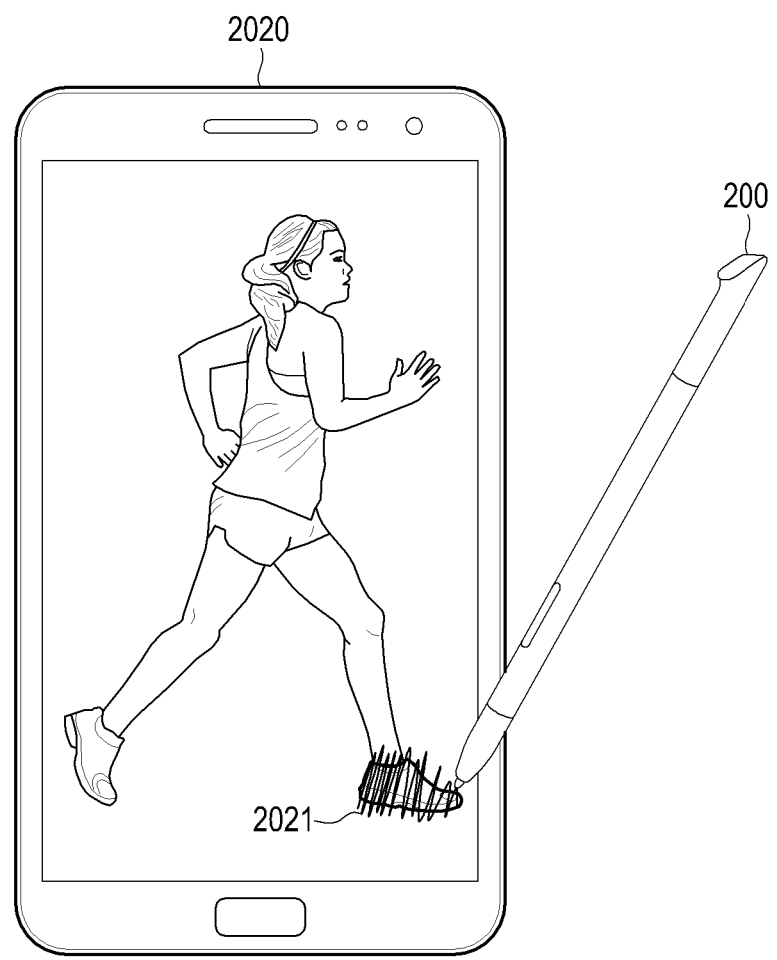
Figure 20C:
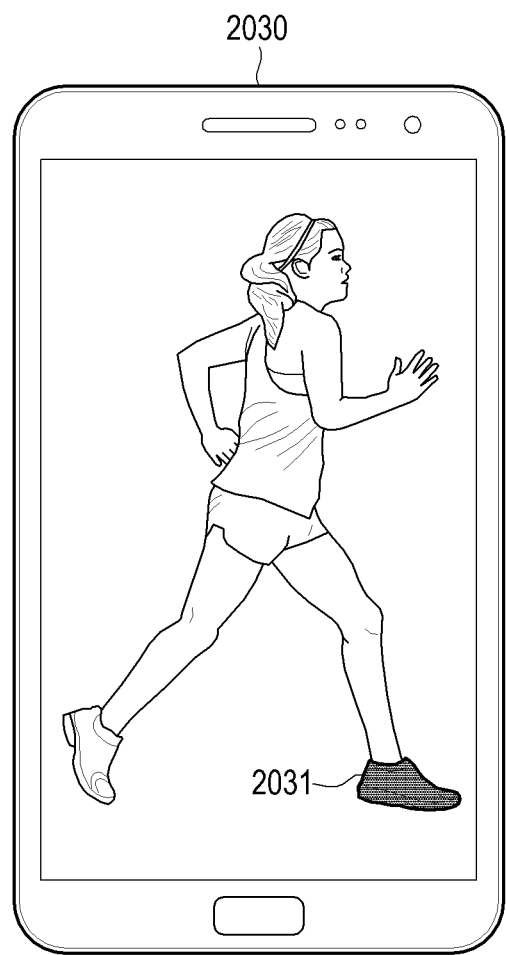

FIGS. 20A through 20C are diagrams illustrating a sixth example of controlling a user interface according to another exemplary embodiment.

Referring to FIG. 20A, an electronic device 2010 according to an exemplary embodiment may display an application, such as a drawing or a picture. To apply a color to an area on the application, a user may form a drawing object area 2011 to be colored using the pen (or an input unit) 200.

Referring to FIG. 20B, an electronic device 2020 senses that the drawing object area formed in FIG. 20A is a closed pattern, and determines whether an operation for coloring the drawing object area is performed. The operation may color an outside area of the drawing object area depending on settings and conditions while the operation is performed such as swaying of an electronic device and the like. When it is determined that the coloring operation is performed by touching the drawing object area or hovering, the controller 110 applies a predetermined color to the drawing object area and displays the drawing object area. The predetermined color may be determined by the user in advance to color the drawing object area. Alternatively, the color may be designated, at the time of the coloring.

Referring to FIG. 20C, an electronic device 2030 applies a predetermined color to the drawing object area 2011 formed in FIG. 20A, like a drawing object area 2031 of FIG. 20C. When a path formed by the input unit 200 is a closed pattern, the controller 110 applies a predetermined color to the drawing object in response to at least one of a touch input and a drawing input provided on an area including the drawing object of the closed pattern.

Figure 21A:
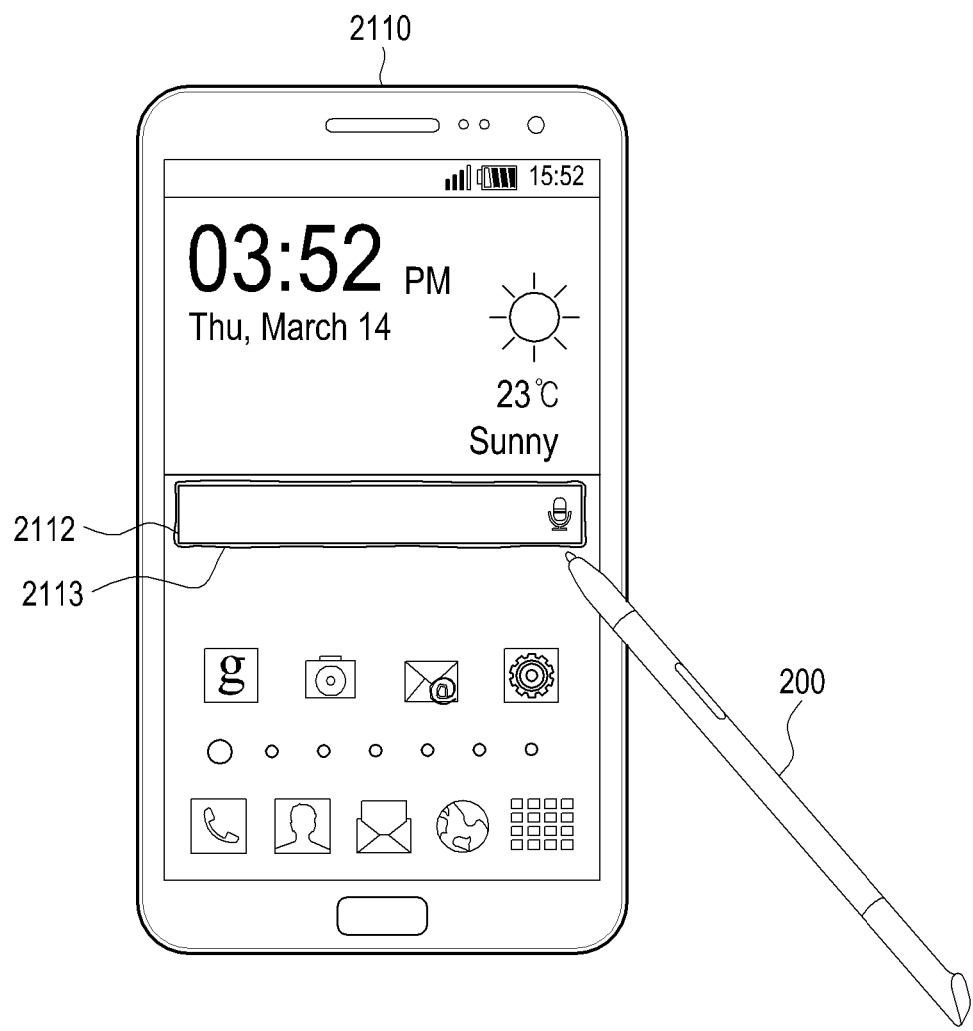
FIGS. 21A through 21C are diagrams illustrating a seventh example of controlling a user interface according to another exemplary embodiment.
Figure 21B:
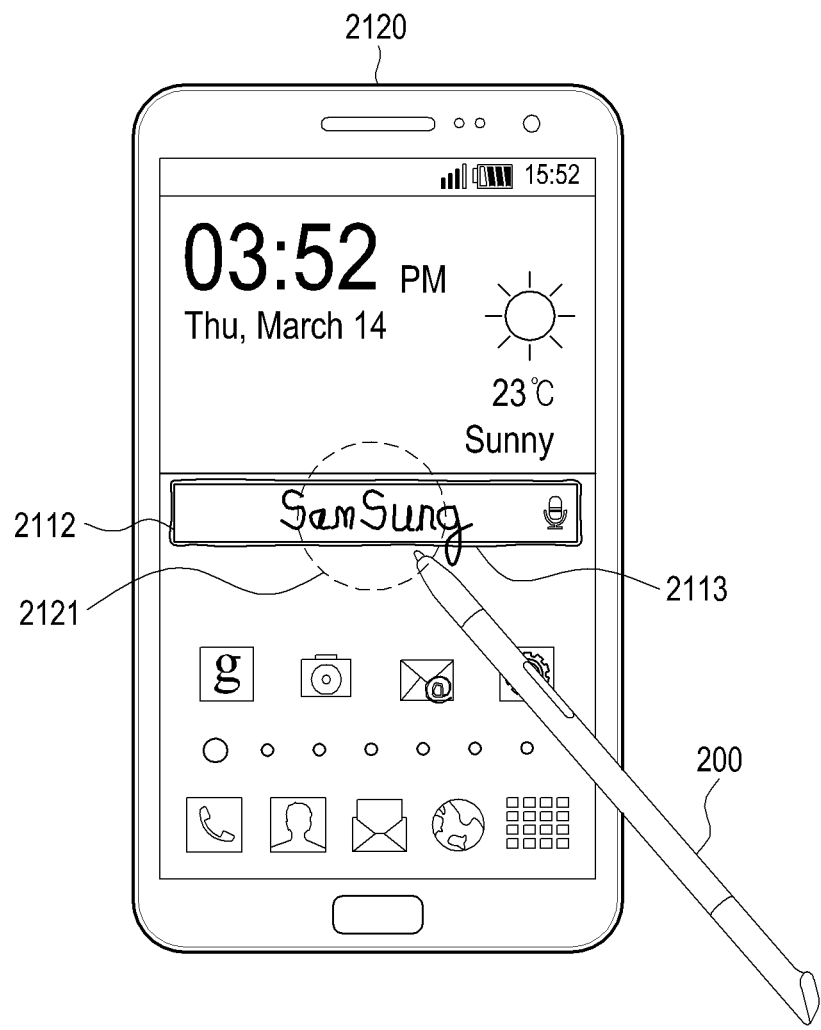
Figure 21C:
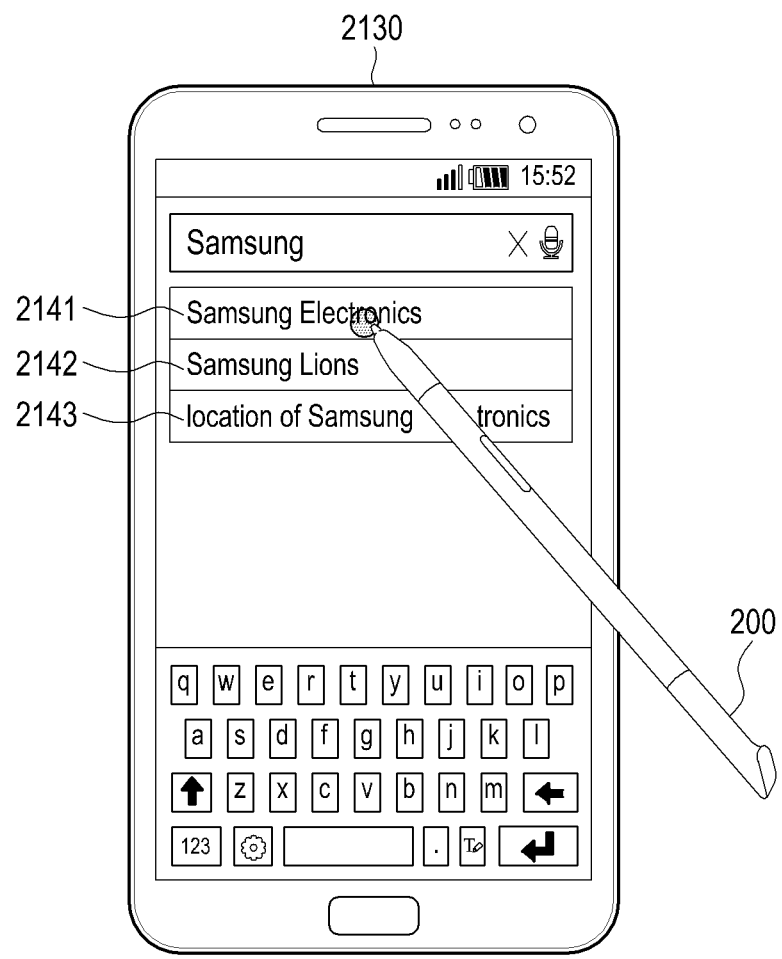

FIGS. 21A through 21C are diagrams illustrating a seventh example of controlling a user interface according to another exemplary embodiment.

Referring to FIG. 21A, an electronic device 2110 according to an exemplary embodiment may display an application including a search box through which search is performed using a keyword input by a user, for example, a main home, an Internet browser, and the like. When a drawing object is formed by the user on or around a keyword input area in the application, the controller 110 determines that a text may be input into the formed drawing object area through a keypad or an input unit 200, and sets a drawing object area 2113 to have a function identical to a search box area 2112. When a text is input into the formed drawing object area, the controller 110 may search for data based on the input text through an external communication network, and displays a search result. As illustrated in FIG. 21A, when the user forms the drawing object 2113 on the search box area 2112 in the main screen using the input unit 200, the controller 110 determines that the drawing object 2113 is an object for selecting the search box area 2112.

Referring to FIGS. 21B and 21C, the controller 110 senses that the drawing object area 2113 formed in FIG. 21A is a closed pattern, and determines that a text may be input into the drawing object area. When a text is input by the user after the drawing object is formed, the controller 110 searches for or downloads information corresponding to the input text through the external communication network, and displays the same on a touch screen. For example, when "Samsung" 2121 is input into the drawing object area 2113, the controller 110, as illustrated in FIG. 21C, displays at least one related search word 2141, 2142, and 2143 associated with the input text, for example, Samsung Electronics, Samsung Lions, a location of Samsung Electronics, and the like. When the user selects a text for a search from among the displayed related search words, for example, Samsung Electronics, data corresponding to Samsung Electronics may be retrieved or downloaded by connecting to the storage unit 175 of the electronic device 2110 or an Internet server (not illustrated). When the drawing object is the search box, the controller 110 searches for information corresponding to a text written in the search box and displays the same on the touch screen.

Figure 22:
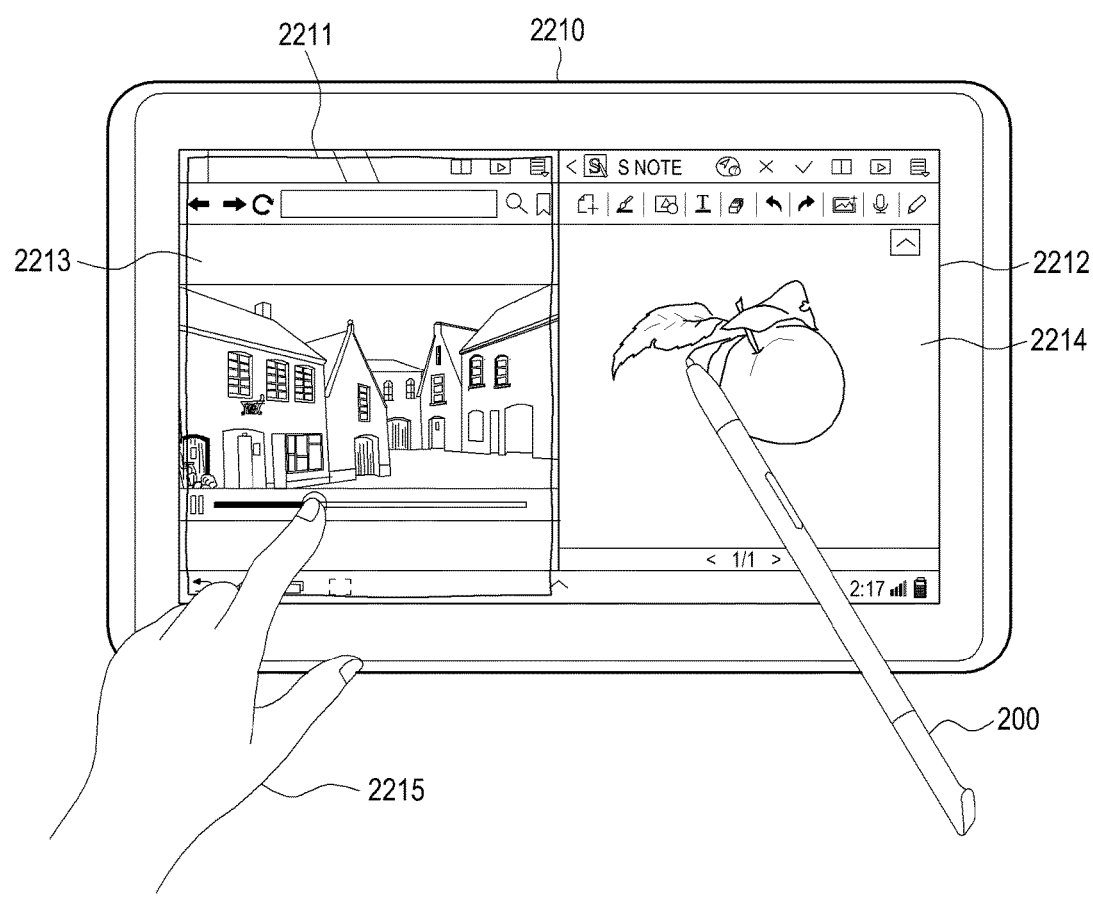
FIG. 22 is a diagram illustrating an eighth example of controlling a user interface according to another exemplary embodiment.

FIG. 22 is a diagram illustrating an eighth example of controlling a user interface according to another exemplary embodiment.

Referring to FIG. 22, the controller 110 changes or converts a touch screen 2212 of an electronic device 2210 into at least one mode. When a drawing object is input into the touch screen 2212, the controller 110 may change a mode applied to the input drawing object to be different from a mode applied to the touch screen 2212. When two or more objects are input, the controller 110 applies different modes to respective drawing objects, or groups at least two drawing objects and applies an identical mode for each drawing object group. As illustrated in FIG. 22, when a drawing object 2211 is input into the touch screen 2212, the controller 110 changes a mode applied to the drawing object 2211, for example, a first area, to be different from a mode applied to the remaining area 2214 excluding the drawing object 2211, for example, a second area. For example, in a case in which the touch screen 2212 is currently in a mode for receiving a command by an input unit 200, when the drawing object, for example, the first area, is formed, the controller 110 changes the mode for receiving a command by the input unit 200 in the first area into a mode that senses a command that is input through a body part 2215 of a user, for example, a finger. Subsequently, a drawing or a picture 2213 may be displayed in the first area by the user, and a drawing may be drawn by the user in the second area 2214. Also, the first area may display various applications that receive a touch input by a body part of the user and may execute a predetermined function, and the second area may display various applications that receive a command input by an input unit 200 and execute a predetermined function. As described above, when the touch screen is in a mode for receiving a touch input by an input unit 200, the controller 110 converts a drawing object area into a mode for receiving a touch by a body part of the user. When the touch screen is in a mode for receiving a touch input by a body part of the user, the controller 110 converts the drawing object area into a mode for receiving a touch input by the input unit 200.

Figure 23A:
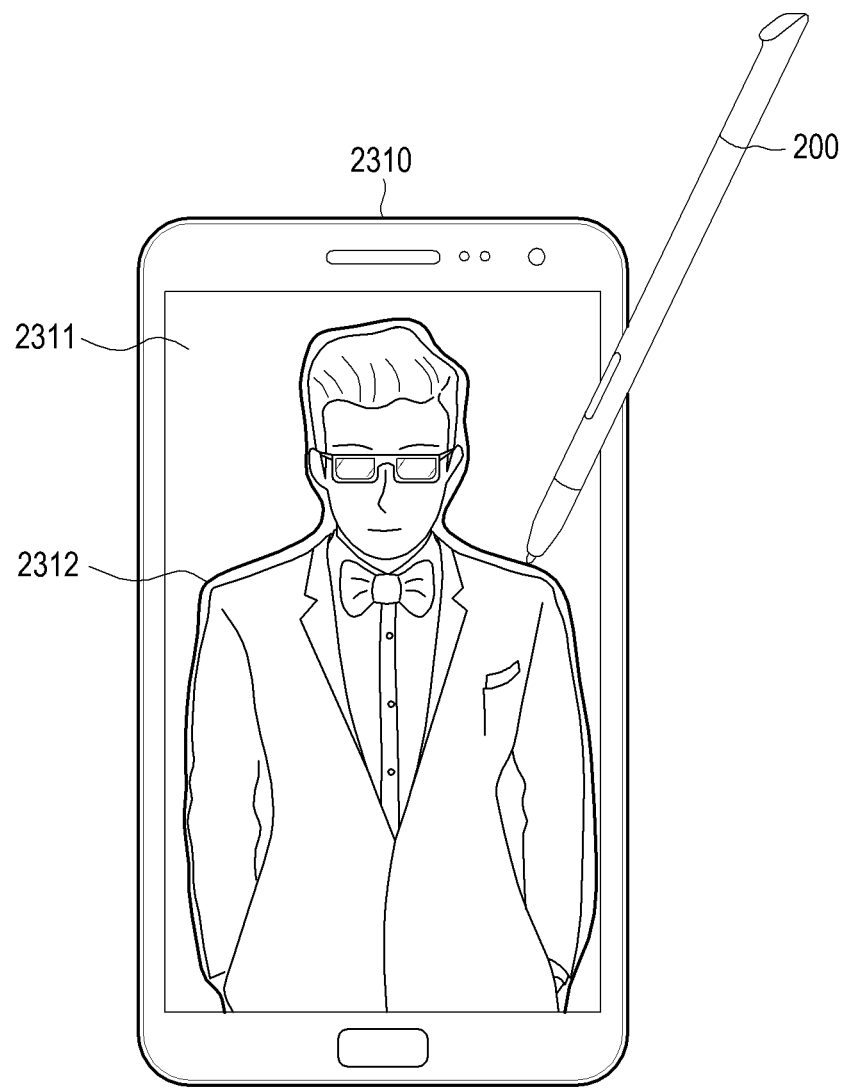
FIGS. 23A through 23C are diagrams illustrating a ninth example of controlling a user interface according to another exemplary embodiment.
Figure 23B:
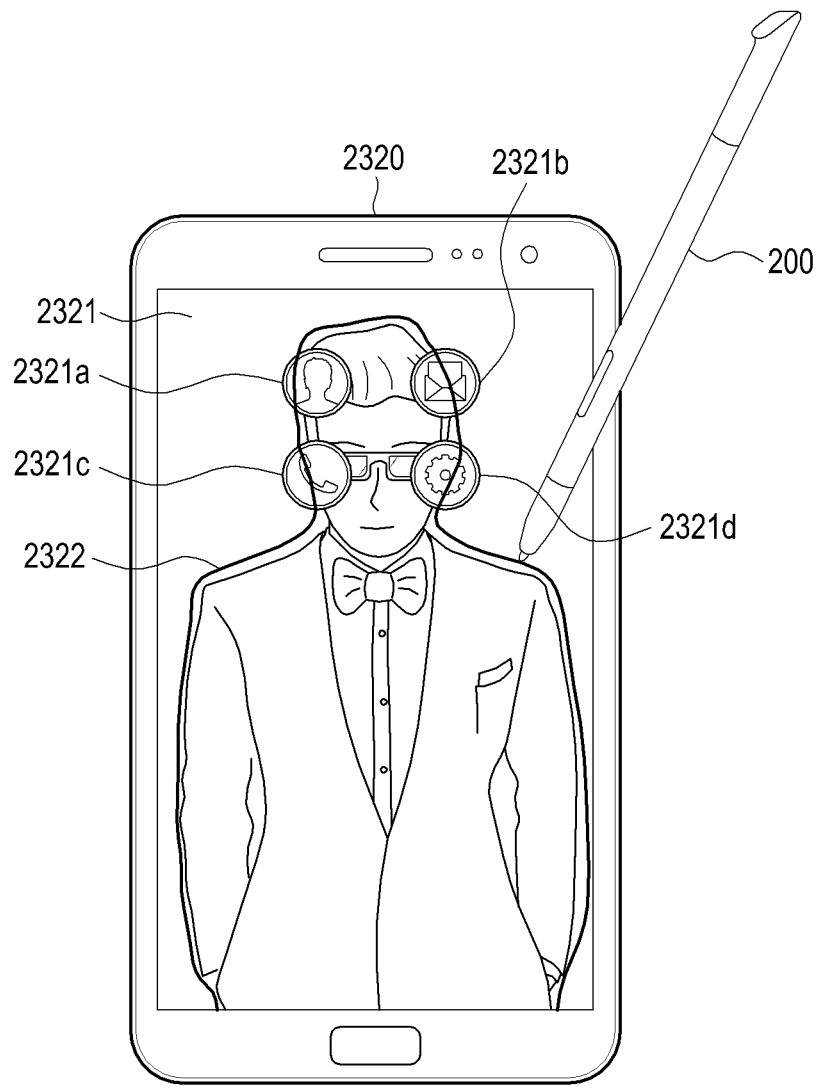
Figure 23C:
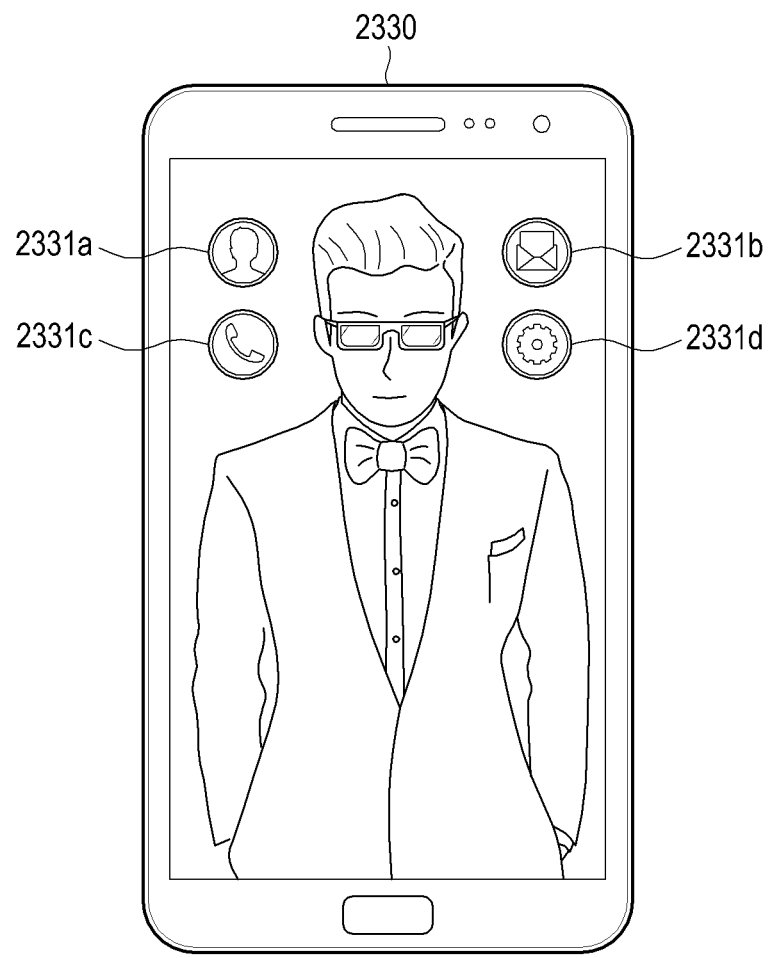

FIGS. 23A through 23C are diagrams illustrating a ninth example of controlling a user interface according to another exemplary embodiment.

Referring to FIGS. 23A through 23C, the controller 110 according to an exemplary embodiment may execute and display a picture, a drawing, or an application on a touch screen of an electronic device 2310. Also, the electronic device 2310 may display a picture or a drawing on a main screen. For example, as illustrated in FIG. 23A, when the controller 110 displays a picture or a drawing 2311 on the touch screen, and when a path 2312 is formed along an outline of the displayed picture or drawing, the controller 110 senses the path and stores the path formed on the displayed picture or drawing. The path may be a virtual path, which may be shown or may not be shown.

Also, as illustrated in FIG. 23B, the controller 110 may form a path on the picture or drawing displayed on a main screen of an electronic device 2320. As illustrated in FIG. 23B, on the touch screen, a picture 2321 is displayed, and a plurality of icons 2321a through 2321d may be displayed. When the user inputs a path 2322 using the input unit 200, the controller 110 determines whether an icon is present on or within the path 2322. The controller 110 moves an icon present on or within the path 2322 outside the path, as illustrated in FIG. 23C. The controller 110 senses the path, and moves at least one icon displayed on the main screen outside the sensed path. The path may be a virtual path, which may be shown or may not be shown. The controller 110 displays a path while the path is formed, moves the path when the path is completed, and does not show the path. Referring to FIG. 23C, an icon 2331a through 2331d that is inside the path or on the path may be moved outside the path based on a control of the controller 110. Therefore, the electronic device 2330 moves at least one icon, and puts a touch screen mode into an idle mode.

As described above, one or more exemplary embodiments provides a user interface that may express a drawing object corresponding to a touch input of a user. While an application is executed, one or more exemplary embodiments may enable another application that is connected through a drawing object drawn by the user to be executed. For instance, the drawing object may correspond to another input, such as a path of a mouse.

While various exemplary embodiments have been shown and described, it will be understood by those skilled in the art that various changes in form and details may be made therein without departing from the spirit and scope as defined by the appended claims.

What is claimed is:

1. A method for controlling a user interface of an electronic device, the method comprising:
    executing a first application on a touch screen of the electronic device;
    displaying a drawing object having outer boundaries, the drawing object formed by a path input inside boundaries of the executed first application which is displayed on the touch screen;
    applying a second application different from the first application to an area of the drawing object,
    executing the second application inside the area of the drawing object; and
    controlling the user interface to display the second application in the area of the drawing object and to display the first application in a remaining area excluding the drawing object area.

2. The method of claim 1, further comprising:
    applying an execution result to the first application in response to a request for executing the second application.

3. The method of claim 2, wherein the executing of the second application comprises displaying an image list inside the drawing object area, if the second application is an image library application; and
    wherein the applying the execution result comprises displaying a selected image to be included in an execution screen of the first application in response to a request for selecting at least one image from the displayed image list.

4. The method of claim 2, wherein the executing the second application comprises displaying an image list inside the drawing object area if the second application is an image library application; and
    wherein the applying the execution result comprises cropping the displayed image along an outline in response to a request for selecting a selected image, and generating the cropped image as an input image with respect to the first application.

5. The method of claim 2, wherein the executing the second application comprises activating a camera if the second application is an image capturing application, displaying a preview image captured by the camera inside the drawing object area, and displaying, inside the drawing object area, an image captured by a capturing command; and wherein the applying the execution result comprises displaying the captured image to be included in an execution screen of the first application as an input image with respect to the first application, in response to a request for executing the image capturing application.

6. The method of claim 2, wherein the executing the second application comprises activating a camera if the second application is an image capturing application, displaying, inside the drawing object area, a preview image captured by the camera, and displaying, inside the drawing object area, an image captured by a capturing command; and wherein the applying the execution result comprises cropping the captured image along an outline in response to a request for executing the image capturing application, and generating the cropped image as an input image with respect to the first application.

7. The method of claim 2, wherein the executing the second application comprises displaying a map image inside the drawing object area if the second application is a map application; and wherein the applying the execution result comprises displaying the map image to be included in an execution screen of the first application as an input image with respect to the first application, in response to a request for executing the map application.

8. The method of claim 2, wherein the executing the second application comprises displaying a map image inside the drawing object area if the second application is the map application; and the applying the execution result comprises cropping the map image along an outline in response to a request for executing the map application, and generating the cropped image as an input image with respect to the first application.

9. The method of claim 1, wherein the displaying comprises:

providing a visual effect to an outline of the drawing object, and displaying the drawing object.

10. The method of claim 9, wherein the visual effect includes an effect in which the drawing object is separated along an outline of the drawing object and the drawing object is expressed based on a three-dimensional (3D) pop-up book scheme.

11. The method of claim 10, wherein the visual effect includes an effect in which the drawing object expressed based on the 3D pop-up book scheme is swayed.

12. The method of claim 9, wherein, if the path is an open pattern, the visual effect includes an effect in which the drawing object is separated along an outline of the drawing object and the drawing object is expressed based on a 3D pop-up book scheme.

13. The method of claim 9, wherein, if the path is a closed pattern, the visual effect includes an effect in which the entire drawing object is separated along an outline of the drawing object and the drawing object is expressed as a 3D graphic.

14. The method of claim 9, wherein, if the path is a closed pattern, the visual effect includes an effect in which a predetermined color is applied to the drawing object in response to at least one of a touch input and a drawing input provided to an area including the drawing object of the closed pattern.

15. The method of claim 9, wherein, if at least one icon is displayed on the screen, the at least one displayed icon is moved to an outside of the formed drawing object.

16. The method of claim 1, wherein the executing of the second application comprises:

if a plurality of second applications associated with the first application exist, providing a list of the plurality of second applications; and calling an application selected from the list and executing the selected application inside the drawing object area.

17. The method of claim 1, wherein, if the path is a closed pattern, the method further comprises:

applying a predetermined color to the drawing object in response to at least one of a touch input and a drawing input provided to the drawing object area.

18. The method of claim 1, wherein, if the drawing object is a search box, the method further comprises:

searching for information corresponding to a text written in the search box; and displaying the searched information on the touch screen.

19. The method of claim 1, further comprising:

converting the drawing object area into a mode for receiving a touch using a body part of a user if the touch screen is in a mode for receiving a touch using an input unit; and converting the drawing object area into a mode for receiving a touch using the input unit if the touch screen is in a mode for receiving a touch using a body part of the user.

20. An electronic device configured to control a user interface, the electronic device comprising:

a touch screen configured to execute a first application and to display a drawing object having outer boundaries, the drawing object formed by a path input inside boundaries of the executed first application which is displayed on the touchscreen; and a controller configured to apply a second application different from the first application to an area of the drawing object, to execute the second application inside the area of the drawing object, and to control the user interface to display the second application in the area of the drawing object and to display the first application in a remaining area excluding the drawing object area.

21. The electronic device of claim 20, wherein the controller is further configured to apply an execution result to the first application in response to an input of a request for executing the second application.

22. The electronic device of claim 21, wherein, if a plurality of second applications associated with the first application exist, the controller is further configured to control the touch screen to display a list of the plurality of second applications on the touch screen, and to call an application selected from the displayed list so as to execute the application inside the drawing object area.

23. The electronic device of claim 20, wherein, if the second application is an image library application, the controller is further configured to control the touch screen to display an image list inside the drawing object area, and to control the touch screen to display a selected image to be included in an execution screen of the first application in response to a request for selecting at least one image from the displayed image list.

24. The electronic device of claim 20, wherein, if the second application is an image library application, the controller is further configured to control the touch screen to display an image list inside the drawing object area, to crop the displayed image along an outline in response to a request for selecting of a selected image, and to generate the cropped image as an input image with respect to the first application.

25. The electronic device of claim 20, wherein, if the second application is an image capturing application, the controller is further configured to control the touch screen to display, inside the drawing object area, a preview image captured by activating a camera, to control the touch screen to display, inside the drawing object area, a captured image in response to a capturing command, and to control the touch screen to display the captured image to be included in an execution screen of the first application as an input image with respect to the first application in response to a request for executing the image capturing application.

26. The electronic device of claim 20, wherein, if the second application is an image capturing application, the controller is further configured to control the touch screen to display, inside the drawing object area, a preview image captured by activating a camera, to control the touch screen to display, inside the drawing object area, a captured image in response to a capturing command, to crop the captured image along an outline in response to a request for executing the image capturing application, and to generate an input image with respect to the first application.

27. The electronic device of claim 20, wherein, if the second application is a map application, the controller is further configured to control the touch screen to display a map image inside the drawing object area, and to control the touch screen to display the map image to be included in an execution screen of the first application as an input image with respect to the first application in response to a request for executing the map application.

28. The electronic device of claim 20, wherein, if the second application is a map application, the controller is further configured to control the touch screen to display a map image inside the drawing object area, to crop the map image along an outline in response to a request for executing the map application, and to generate the cropped image as an input image with respect to the first application.

29. The electronic device of claim 20, wherein, if the path is a closed pattern, the controller is further configured to apply a predetermined color to the drawing object in response to at least one of a touch input and a drawing input provided to the drawing object area, and to control the touch screen to display the drawing object.

30. The electronic device of claim 20, wherein, if the drawing object is a search box, the controller is further configured to search for information corresponding to a text written in the search box and to control the touch screen to display the information.

31. The electronic device of claim 20, wherein, if the touch screen is in a mode for receiving a touch using an input unit, the controller is further configured to convert the drawing object area into a mode for receiving a touch using a body part of a user; and if the touch screen is in a mode for receiving a touch using a body part of the user, the controller is further configured to convert the drawing object area into a mode for receiving a touch using the input unit.

32. The electronic device of claim 20, wherein, if at least one icon is displayed on the touch screen, the controller is further configured to move the at least one displayed icon to the remaining area.

33. The electronic device of claim 20, wherein the controller is further configured to provide a visual effect to the drawing object and to display the drawing object on the touch screen.

* * * * *